United States Patent
Maruhashi et al.

(10) Patent No.: US 10,170,931 B2
(45) Date of Patent: Jan. 1, 2019

(54) ELECTRIC POWER CONTROL SYSTEM

(71) Applicant: NEC Corporation, Tokyo (JP)

(72) Inventors: Kenichi Maruhashi, Tokyo (JP); Takashi Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 301 days.

(21) Appl. No.: 14/766,017

(22) PCT Filed: Feb. 6, 2014

(86) PCT No.: PCT/JP2014/000631
§ 371 (c)(1),
(2) Date: Aug. 5, 2015

(87) PCT Pub. No.: WO2014/122930
PCT Pub. Date: Aug. 14, 2014

(65) Prior Publication Data
US 2015/0364952 A1    Dec. 17, 2015

(30) Foreign Application Priority Data

Feb. 7, 2013  (JP) ................................. 2013-022001
Apr. 9, 2013  (JP) ................................. 2013-081131

(51) Int. Cl.
*H01H 45/00* (2006.01)
*H02J 11/00* (2006.01)
(Continued)

(52) U.S. Cl.
CPC .............. *H02J 11/00* (2013.01); *G06Q 50/06* (2013.01); *H02J 3/14* (2013.01); *H02J 4/00* (2013.01);
(Continued)

(58) Field of Classification Search
None
See application file for complete search history.

(56) References Cited

U.S. PATENT DOCUMENTS 5,436,511 A     7/1995  Nigawara et al.
8,862,282 B2 *  10/2014  Ohara ................. F24D 19/1048
                                                      700/286
(Continued)

FOREIGN PATENT DOCUMENTS

JP  H05-064354 A  3/1993
JP  H05-083854    4/1993
(Continued)

OTHER PUBLICATIONS

International Search Report corresponding to PCT/JP2014/000631, dated Apr. 22, 2014, 2 pages.
(Continued)

*Primary Examiner* — Cassandra Cox
(74) *Attorney, Agent, or Firm* — Wilmer Cutler Pickering Hale and Dorr LLP

(57) ABSTRACT

An electric power control system of the present invention is connected to an electric power supplying means for supplying electric power and a load means for accepting supply of electric power and consuming the electric power. The electric power control system includes: a supplied energy acquiring means for acquiring a supplied energy, which is the amount of electric power supplied from the electric power supplying means; a consumed energy acquiring means for acquiring a consumed energy, which is the amount of electric power consumed by the load means; and an electric power supply and demand controlling means for, depending on a total supplied energy as the total of the acquired supplied energy and a total consumed energy as the total of the acquired consumed energy, transmitting and/or receiving electric power to and from another device to change the total supplied energy.

3 Claims, 22 Drawing Sheets

(51) Int. Cl.
  *G06Q 50/06* (2012.01)
  *H02J 3/14* (2006.01)
  *H02J 4/00* (2006.01)
  *H02J 3/00* (2006.01)

(52) U.S. Cl.
  CPC ..... *H02J 2003/003* (2013.01); *Y02B 70/3225* (2013.01); *Y04S 10/54* (2013.01); *Y04S 20/222* (2013.01); *Y10T 307/305* (2015.04)

(56) References Cited

U.S. PATENT DOCUMENTS

| | | | |
|---|---|---|---|
| 2006/0119999 | A1 | 6/2006 | Lee et al. |
| 2006/0284489 | A1 | 12/2006 | Gross et al. |
| 2010/0262566 | A1* | 10/2010 | Yamamoto ............ B60L 3/0046 705/412 |
| 2011/0012583 | A1 | 1/2011 | Hyde et al. |
| 2011/0106321 | A1 | 5/2011 | Cherian et al. |
| 2011/0159389 | A1* | 6/2011 | Ohara ................. F24D 19/1048 429/429 |
| 2012/0029720 | A1 | 2/2012 | Cherian et al. |
| 2012/0029897 | A1 | 2/2012 | Cherian et al. |
| 2013/0166085 | A1 | 6/2013 | Cherian et al. |
| 2013/0289787 | A1 | 10/2013 | Rouse et al. |

FOREIGN PATENT DOCUMENTS

| | | | |
|---|---|---|---|
| JP | H07-322500 A | | 12/1995 |
| JP | 09-200963 A | | 7/1997 |
| JP | H10-066261 A | | 3/1998 |
| JP | 2000-333369 | | 11/2000 |
| JP | 2000333369 A | * | 11/2000 |
| JP | 2002-010500 | | 1/2002 |
| JP | 2002-165367 | | 6/2002 |
| JP | 2002-315183 A | | 10/2002 |
| JP | 2003-092834 A | | 3/2003 |
| JP | 2003-134665 A | | 5/2003 |
| JP | 2005-086984 | | 3/2005 |
| JP | 2006-191748 | | 7/2006 |
| JP | 2006-230164 A | | 8/2006 |
| JP | 2008-271625 A | | 11/2008 |
| JP | 2010-057311 | | 3/2010 |
| JP | 2012-019598 | | 1/2012 |
| JP | 2013-510545 | | 3/2013 |
| WO | WO-2005/050809 A1 | | 6/2005 |
| WO | WO-2005/093924 A1 | | 10/2005 |
| WO | WO-2012-008979 | | 1/2012 |
| WO | WO-2012-015507 | | 2/2012 |
| WO | WO-2012-015508 | | 2/2012 |

OTHER PUBLICATIONS

Japanese Office Action issued by the Japan Patent Office for Japanese Application No. 2014-560681 dated Sep. 5, 2017 (8 pages).
Japanese Office Action issued by the Japan Patent Office for Japanese Application No. 2014-560680 dated Jul. 25, 2017 (6 pages).
U.S. Office Action issued by the U.S. Patent and Trademark Office for the U.S. Appl. No. 14/766,223 dated Oct. 6, 2017 (49 pages).
Japanese Notification of Reasons for Refusal issued in Japanese Patent Application No. 2014-560680, dated Feb. 20, 2018, 6 pages.
Japanese Office Action issued by the Japan Patent Office for Japanese Application No. 2014-560680 dated Jun. 19, 2018 (7 pages).
U.S. Office Action issued by the U.S. Patent and Trademark Office for the U.S. Appl. No. 14/766,223 dated Sep. 20, 2018 (76 pages).
Examination Report issued by the India Intellectual Property Office for Indian Application No. 6712/DELNP/2015 dated Aug. 24, 2018 (6 pages).

\* cited by examiner

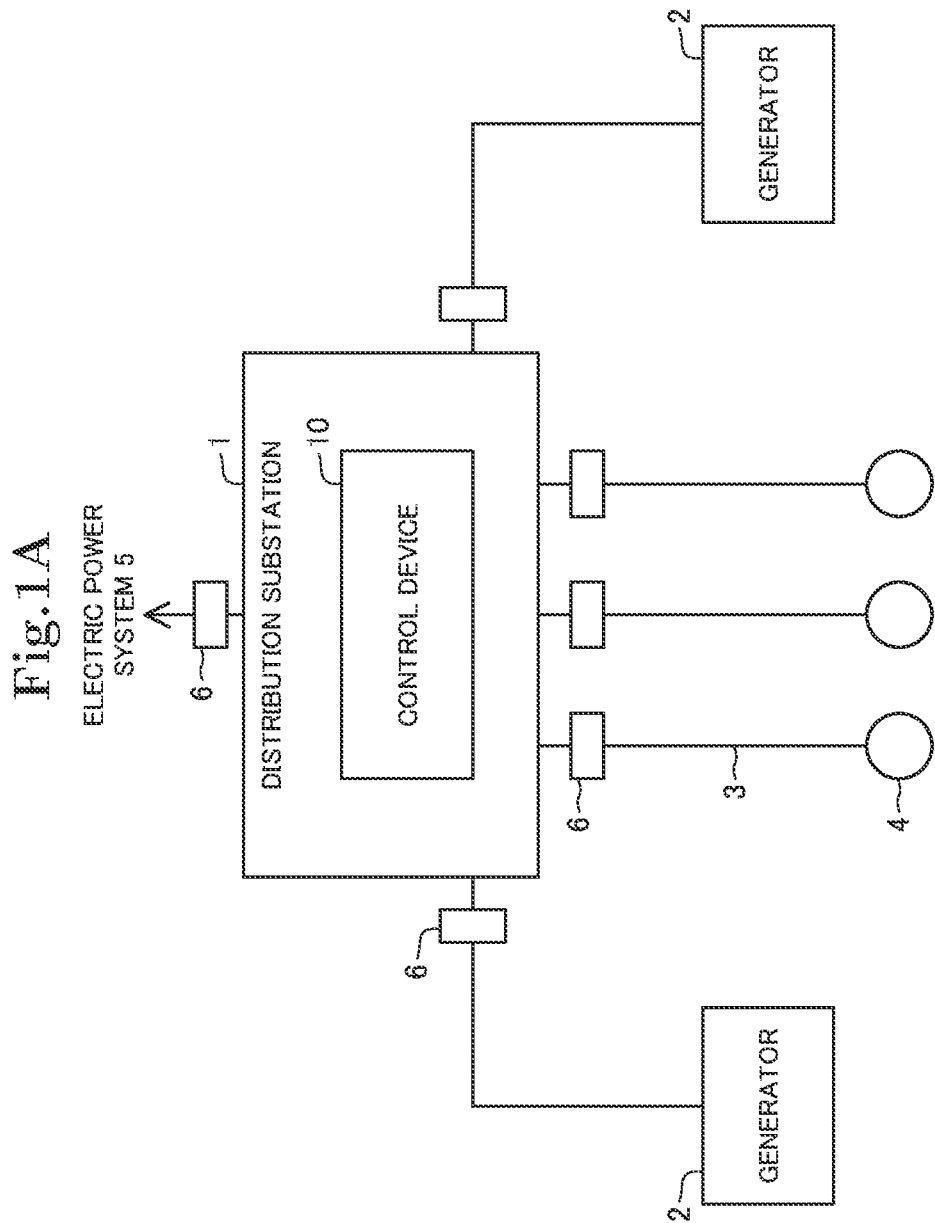

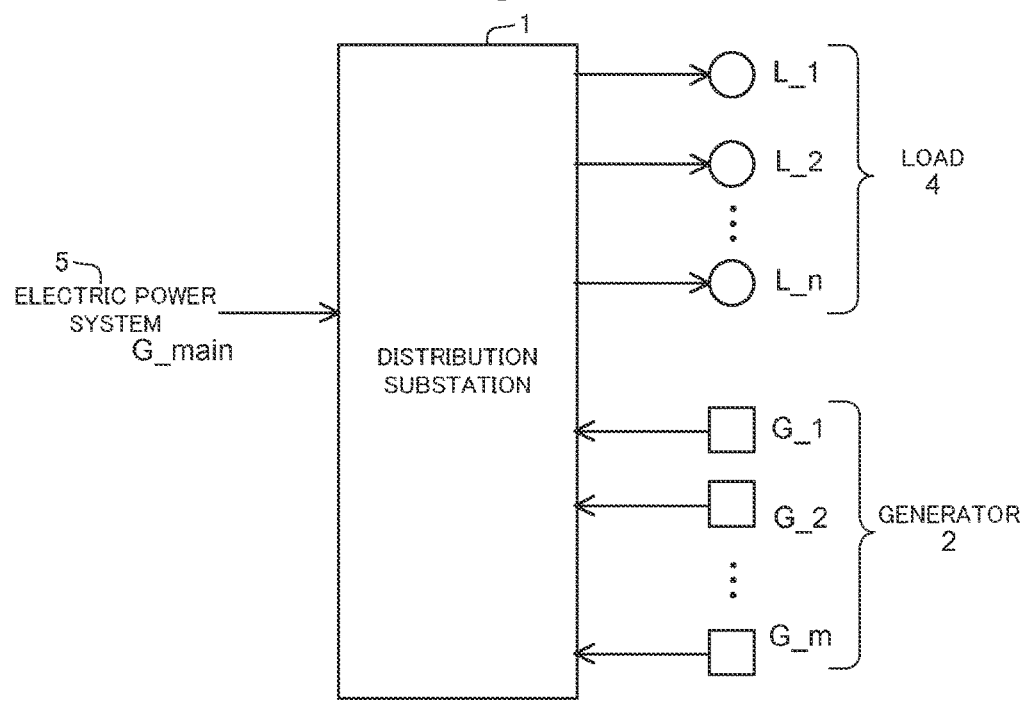

Fig.10
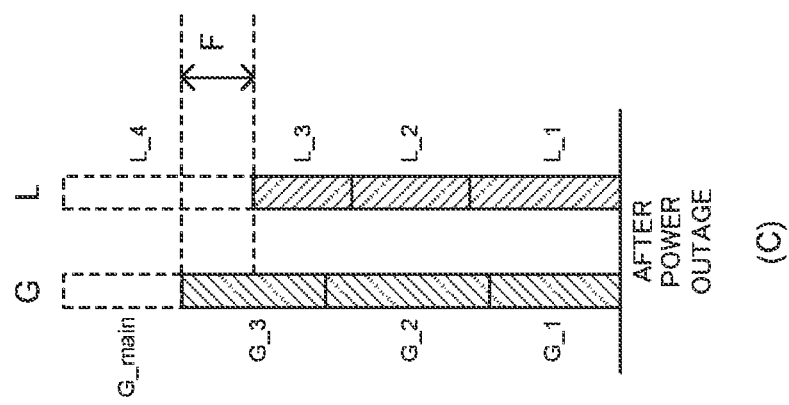
(A)
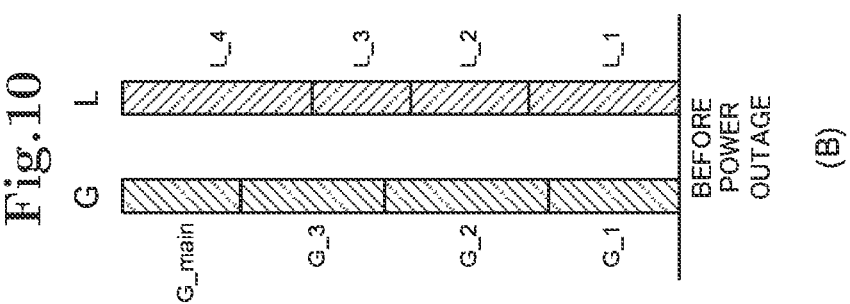
(B) BEFORE POWER OUTAGE
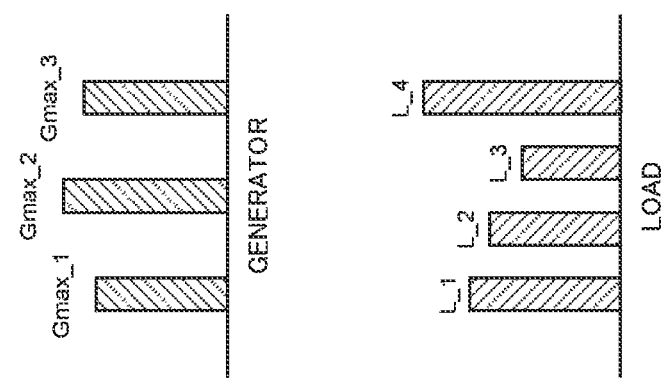
(C) AFTER POWER OUTAGE

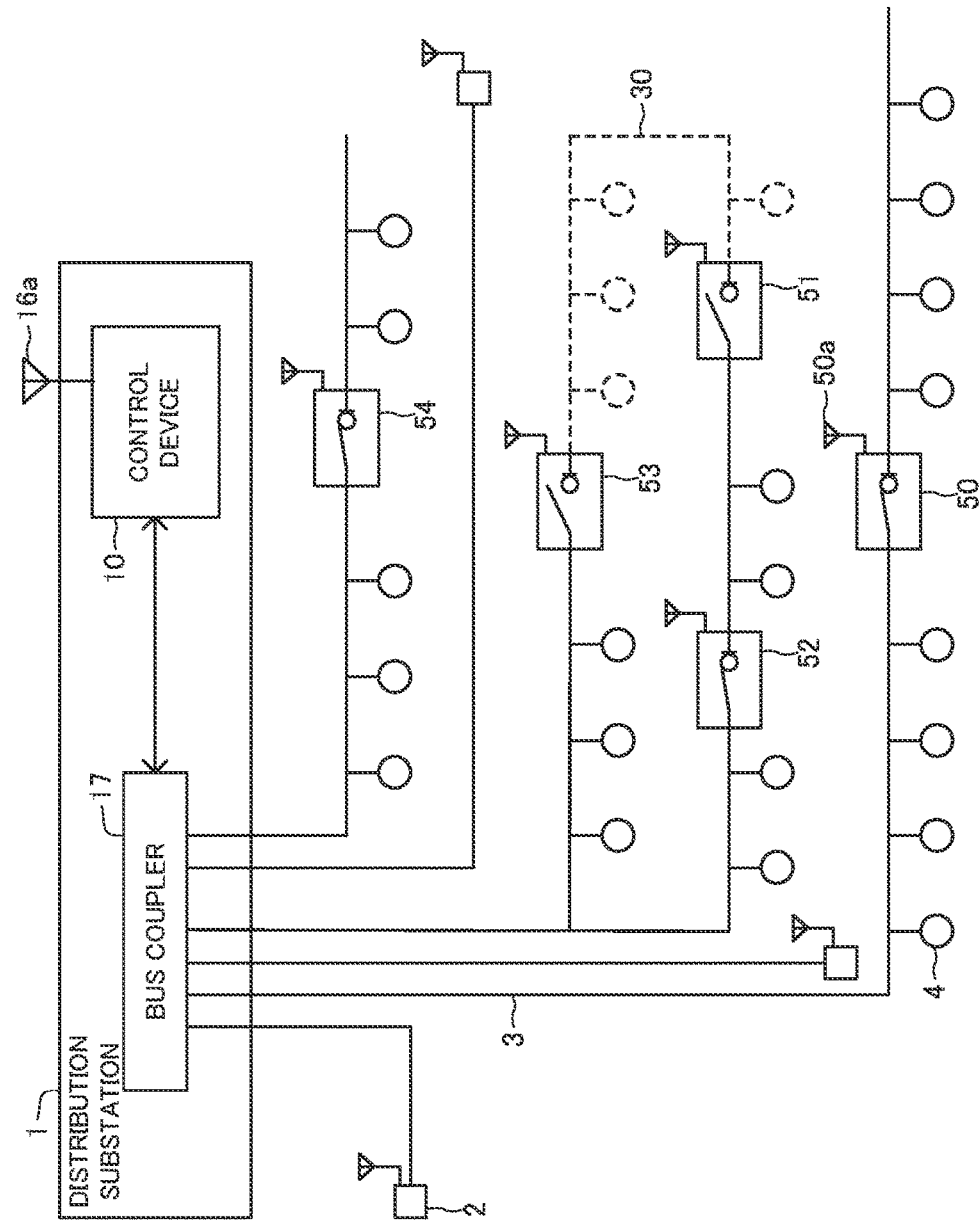

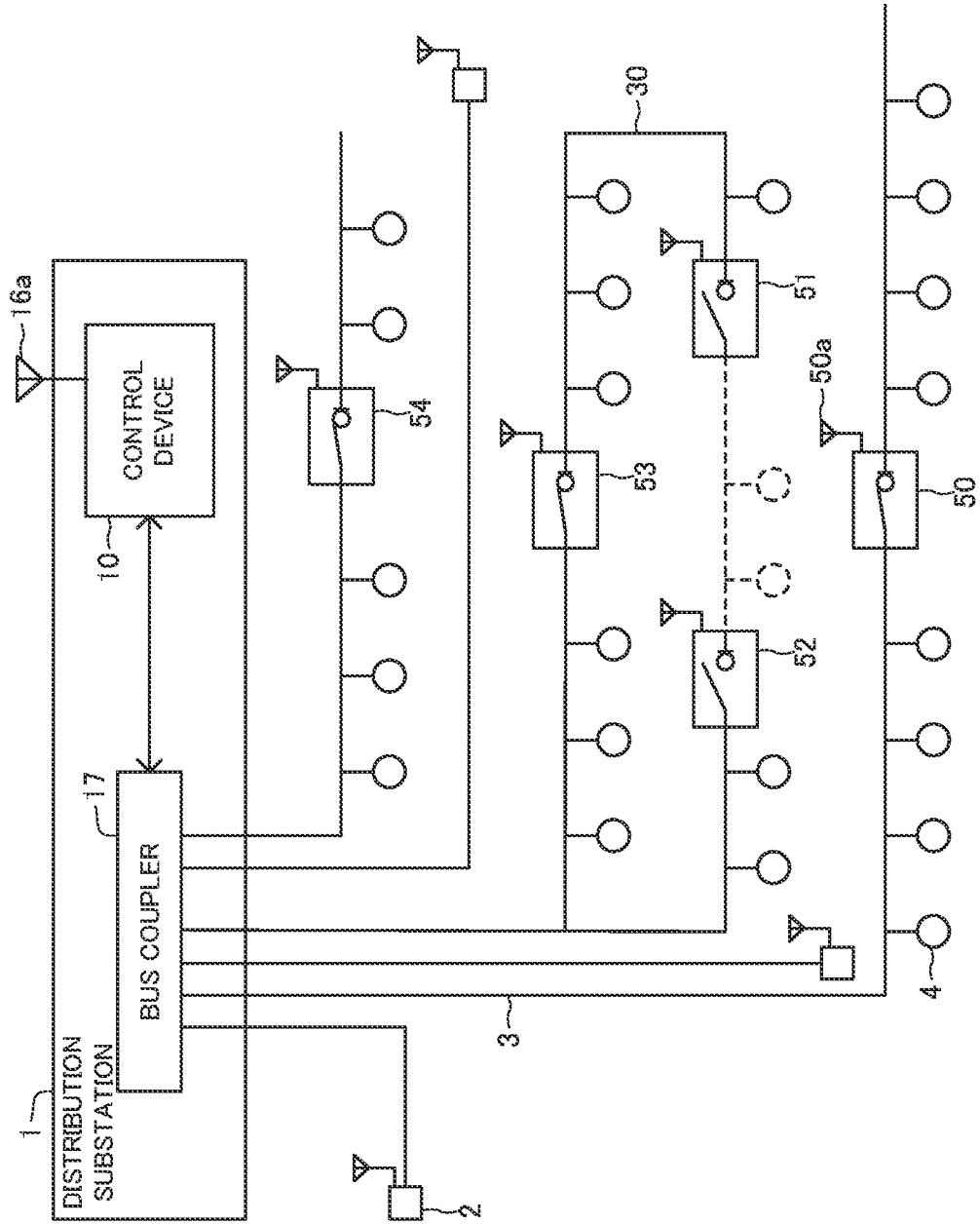

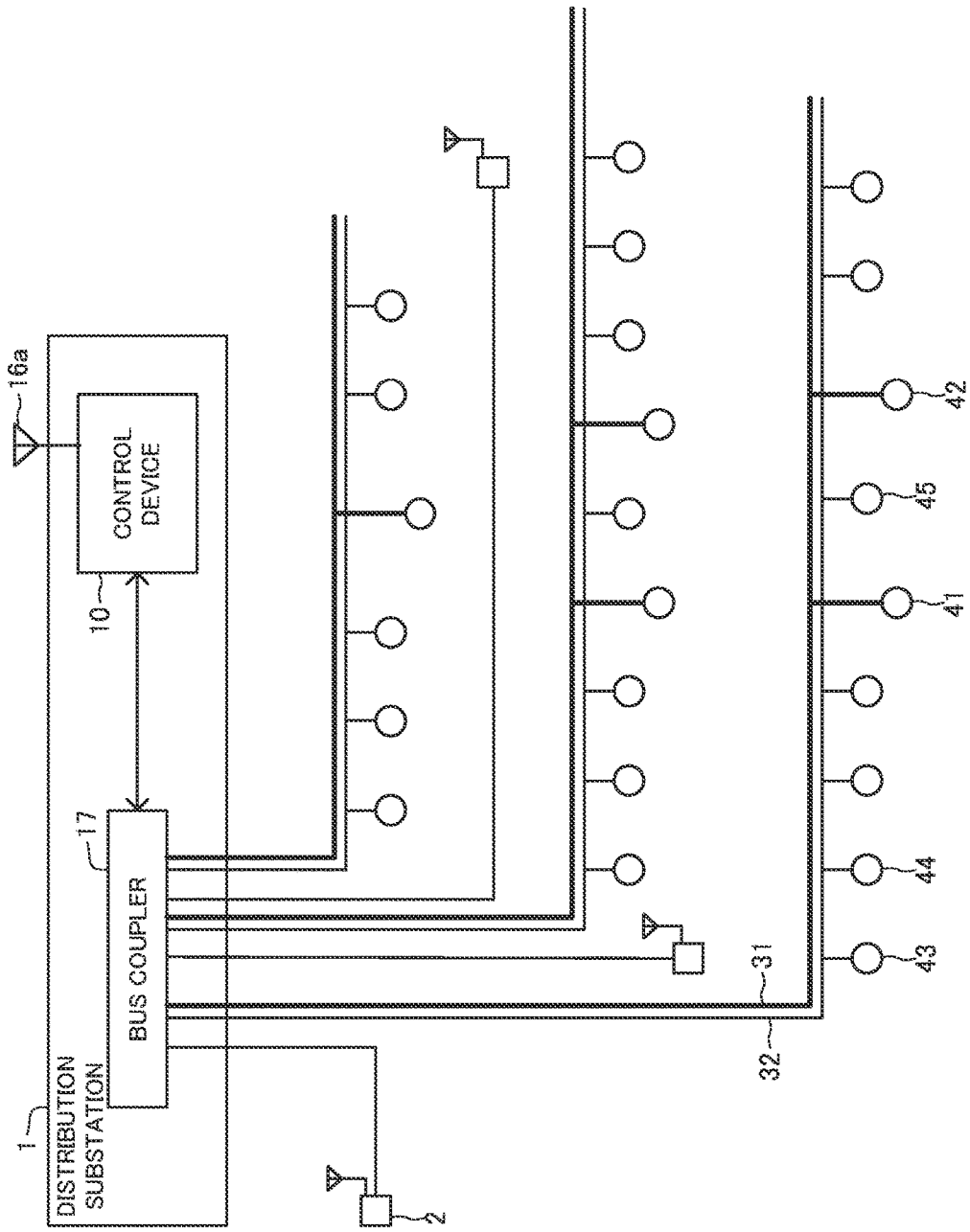

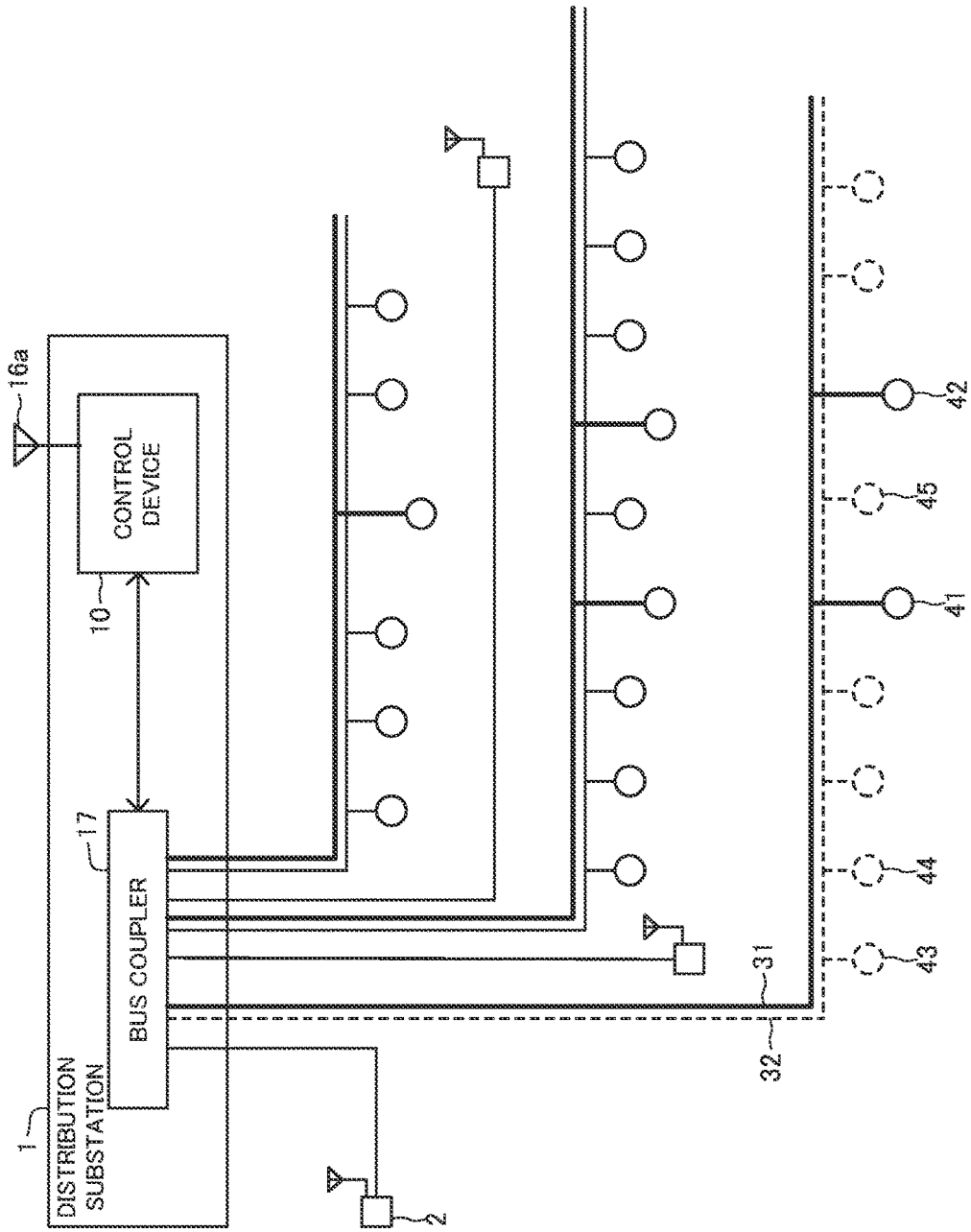

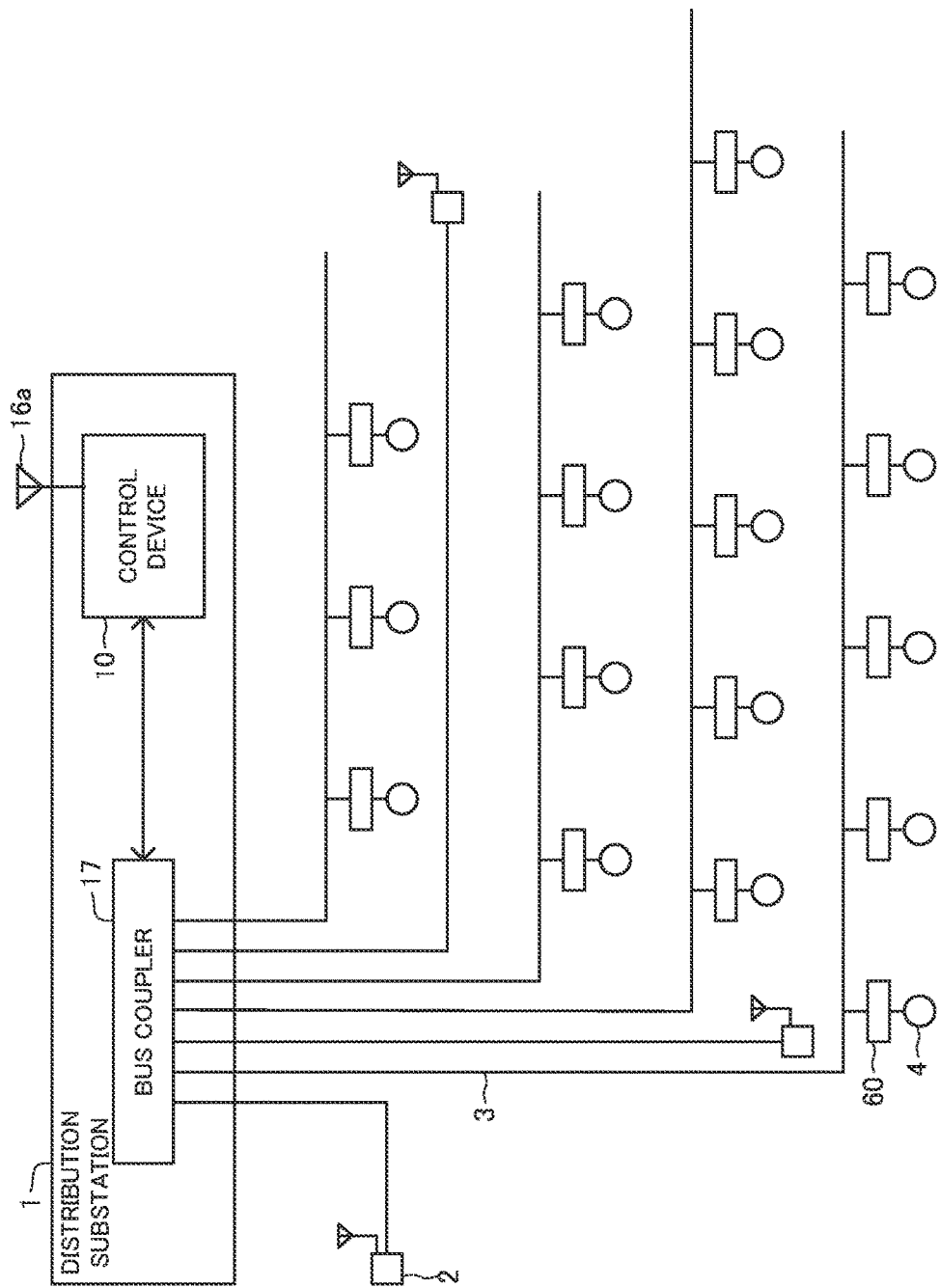

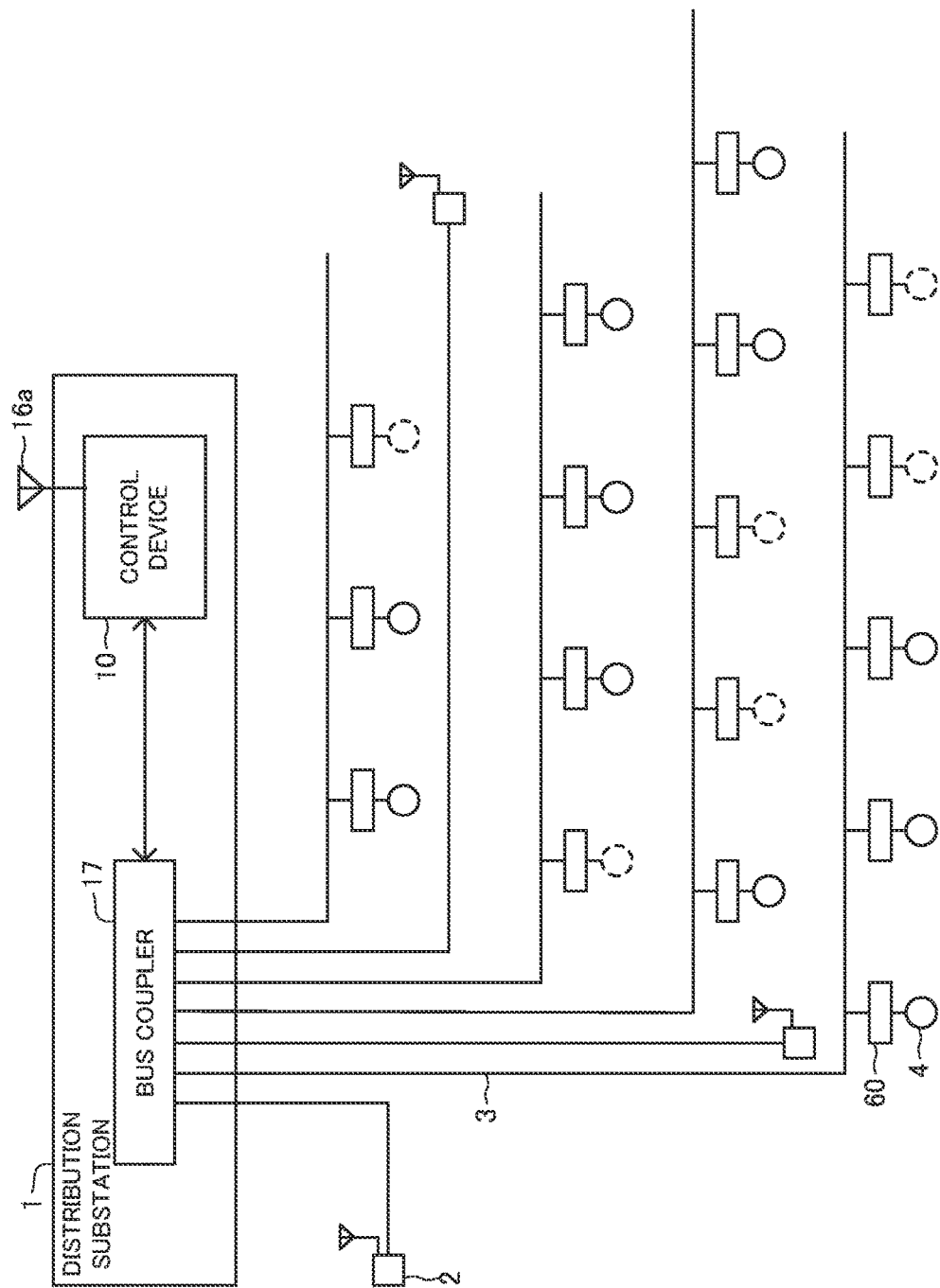

ELECTRIC POWER CONTROL SYSTEM

CROSS-REFERENCE TO RELATED APPLICATIONS

This application is a national stage application of International Application No. PCT/JP2014/000631 entitled "ELECTRIC POWER CONTROL SYSTEM," filed on Feb. 6, 2014, which claims the benefit of the priority of Japanese Patent Application No. 2013-022001, filed on Feb. 7, 2013 and Japanese Patent Application No. 2013-081131, filed on Apr. 9, 2013, the disclosures of each of which are hereby incorporated by reference in their entirety.

TECHNICAL FIELD

The present invention relates to an electric power control system. In particular, the present invention relates to an electric power control system which regulates the balance between supply and demand of electric power in a system.

BACKGROUND ART

A popularly employed method for controlling an electric power system is centralized control of an electric power system (for example, see Patent Document 1). Centralized control of an electric power system requires building of a mechanism for concentrating information and a large-scale control system for grasping and analyzing the whole system configuration condition and also optimizing the whole system. Such a system is easily applied in countries and regions where electric power supply infrastructure has developed to some extent, because it can be built additionally. However, in regions including emerging countries where electric power infrastructure has not developed, new building of the above system requires a large investment in development of the infrastructure.

On the other hand, in terms of optimization of the whole system, there is a proposed approach of distributed control, which is less efficient but enables electric power control without a large investment by regulating voltages between neighboring power plants or comparatively near power plants (for example, see Patent Document 2). In control of an electric power system, generally, matrix calculation is carried out on the basis of information of each generator, and a solution is found. In the case of concentrated control mentioned above, large-scale matrix calculation should be done because all the information is included. On the other hand, in the case of distributed control, sparse matrix calculation is done because control between neighboring or near power plants is executed, and therefore, the amount of calculation is considerably less.

Patent Document 1: Japanese Unexamined Patent Application Publication No. JP-A 2002-165367
Patent Document 2: Japanese Unexamined Patent Application Publication No. JP-A 2010-057311

In recent years, in consideration of the protection of global environment and energy security, natural energy such as solar light, biomass and wind power has been introduced worldwide. However, such natural energy has a problem with the stability of supply and, as such power sources become more popular in the future, it will become a critical issue how to keep the stability of the whole electric power network. In other words, when it comes to electric power generation by natural energy, new entrants to electric power supply increase because the introduction cost is low though the power generation capacity of each generator is small, and moreover, it is worried about that enough reserves cannot be secured in a small-scale electric power system configured mostly by such generators.

SUMMARY

Accordingly, an object of the present invention is to solve the abovementioned problem that enough reserves cannot be secured in a small-scale electric power system and it is difficult to keep stability.

An electric power control system as an aspect of the present invention is connected to an electric power supplying means for supplying electric power and a load means for accepting supply of electric power and consuming the electric power, and includes:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for changing a status of supply of electric power to a distribution line with the load means connected depending on a total supplied energy and a total consumed energy, the total supplied energy being a total of the acquired supplied energy, and the total consumed energy being a total of the acquired consumed energy.

Further, a computer program as another aspect of the present invention is a computer program including instructions for causing an information processing device, which is connected to an electric power supplying means for supplying electric power and a load means for accepting supply of electric power and consuming the electric power, to realize:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for changing a status of supply of electric power to a distribution line with the load means connected depending on a total supplied energy and a total consumed energy, the total supplied energy being a total of the acquired supplied energy, and the total consumed energy being a total of the acquired consumed energy.

Further, an electric power control method as another aspect of the present invention includes:

acquiring a supplied energy which is an amount of electric power supplied from an electric power supplying means for supplying electric power, and also acquiring a consumed energy which is an amount of electric power consumed by a load means for accepting supply of electric power and consuming the electric power; and changing a status of supply of electric power to a distribution line with the load means connected depending on a total supplied energy and a total consumed energy, the total supplied energy being a total of the acquired supplied energy, and the total consumed energy being a total of the acquired consumed energy.

Further, an electric power control system as another aspect of the present invention is connected to an electric power supplying means for supplying electric power and a load means for accepting supply of electric power and consuming the electric power, and includes:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for, depending on a total supplied energy and a total consumed energy, transmitting and receiving electric power to and from another device to change the total supplied energy, the total supplied energy being a total of the acquired supplied energy, and the total consumed energy being a total of the acquired consumed energy.

Further, a computer program as another aspect of the present invention is a computer program including instructions for causing an information processing device, which is connected to an electric power supplying means for supplying electric power and a load means for accepting supply of electric power and consuming the electric power, to realize:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for, depending on a total supplied energy and a total consumed energy, transmitting and receiving electric power to and from another device to change the total supplied energy, the total supplied energy being a total of the acquired supplied energy, and the total consumed energy being a total of the acquired consumed energy.

Further, an electric power control method as another aspect of the present invention includes:

acquiring a supplied energy which is an amount of electric power supplied from an electric power supplying means for supplying electric power, and also acquiring a consumed energy which is an amount of electric power consumed by a load means for accepting supply of electric power and consuming the electric power; and depending on a total supplied energy and a total consumed energy, transmitting and receiving electric power to and from another device to change the total supplied energy, the total supplied energy being a total of the acquired supplied energy, and the total consumed energy being a total of the acquired consumed energy.

With the configurations as described above, the present invention can keep stability in a small-scale power system.

BRIEF DESCRIPTION OF DRAWINGS

FIG. 1A is a block diagram showing a configuration of an electric power control system in a first exemplary embodiment of the present invention;

FIG. 1B is a block diagram showing another configuration of the electric power control system disclosed in FIG. 1A;

FIG. 10 is a diagram showing the state of electric power in an electric power control system in a third exemplary embodiment of the present invention;

FIG. 16 is a diagram showing an example of the configuration of the electric power control system in the third exemplary embodiment of the present invention;

FIG. 17 is a diagram showing an example of the configuration of the electric power control system in the third exemplary embodiment of the present invention;

FIG. 18 is a diagram showing an example of the configuration of the electric power control system in the third exemplary embodiment of the present invention;

FIG. 19 is a diagram showing an example of the configuration of the electric power control system in the third exemplary embodiment of the present invention;

FIG. 20 is a diagram showing an example of the configuration of the electric power control system in the third exemplary embodiment of the present invention; and FIG. 21 is a diagram showing an example of the configuration of the electric power control system in the third exemplary embodiment of the present invention.

EXEMPLARY EMBODIMENTS

First Exemplary Embodiment

Figure 2:
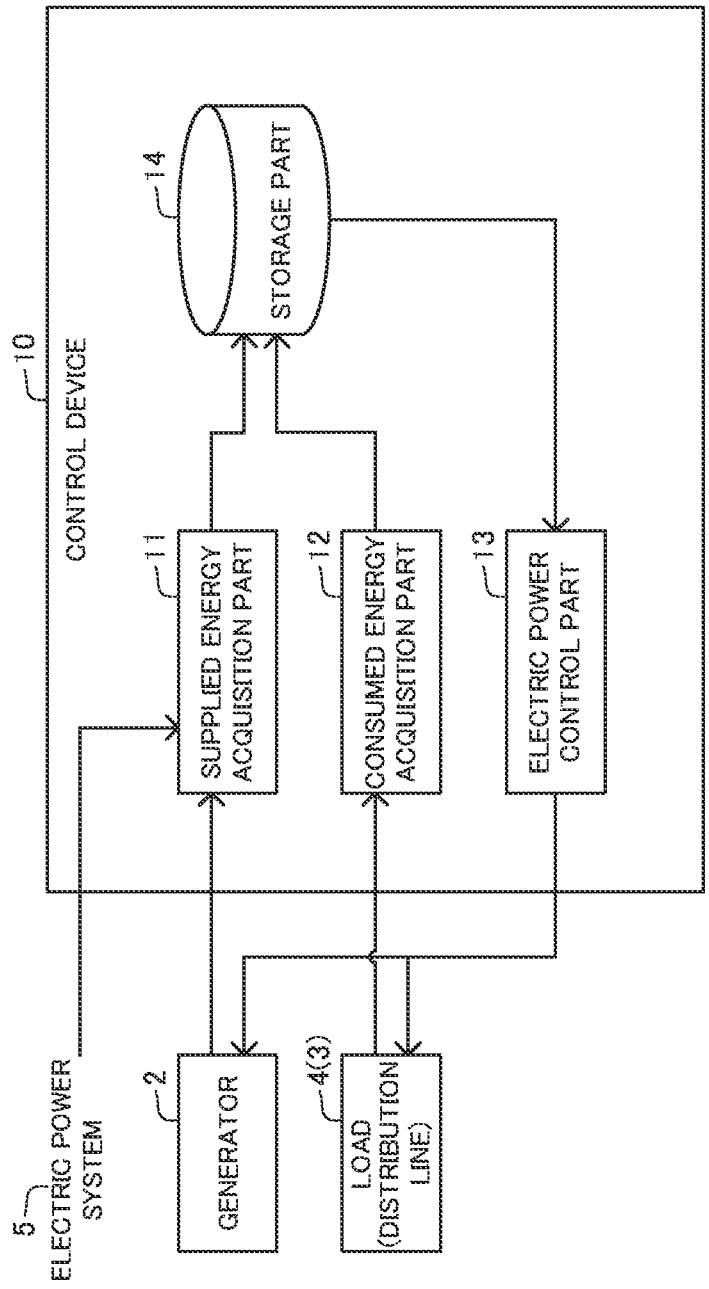
FIG. 2 is a block diagram showing the configuration of a control device disclosed in FIG. 1A.
Figure 3:
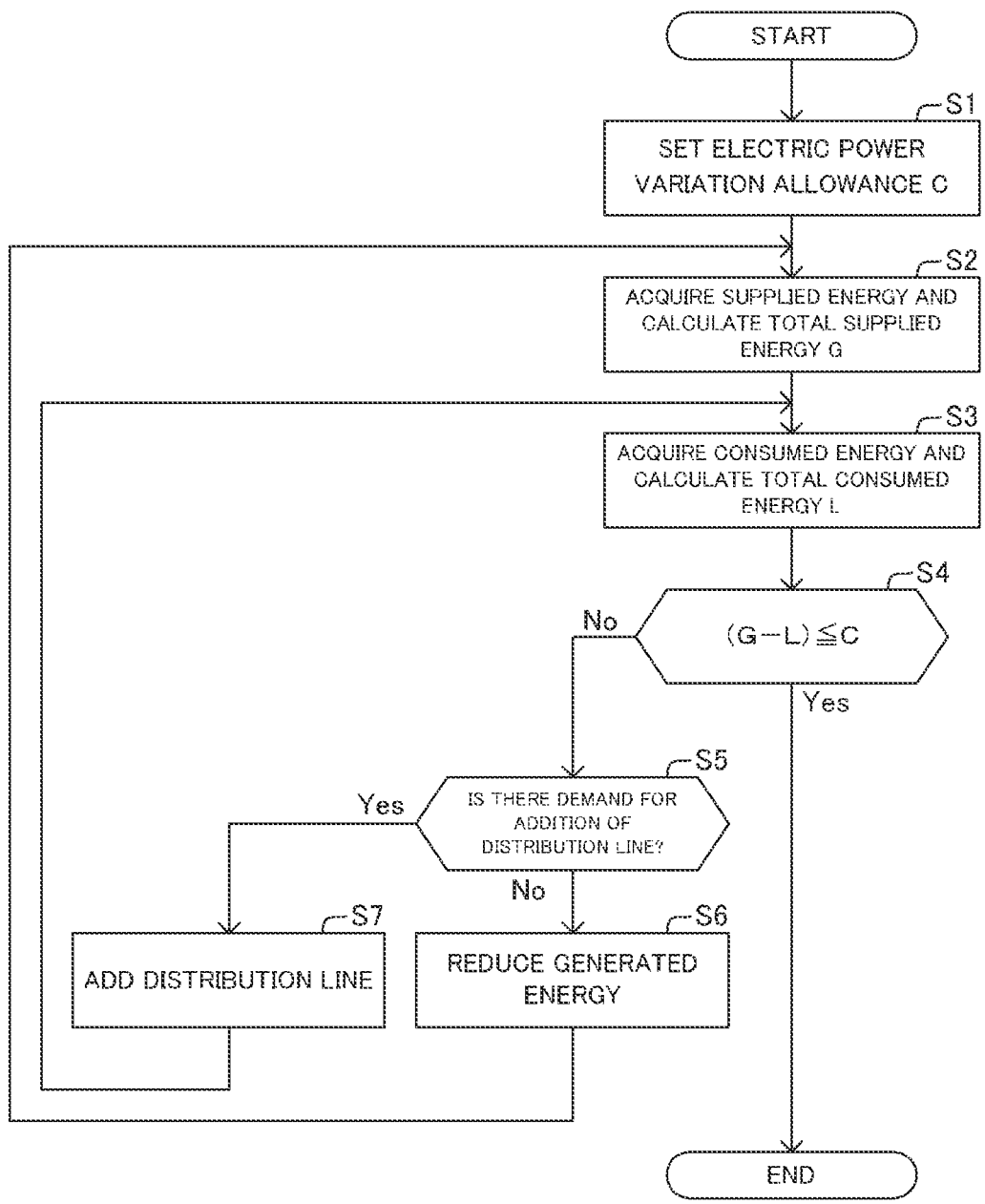
FIG. 3 is a flowchart showing the operation of the control device disclosed in FIG. 1A.
Figure 4:
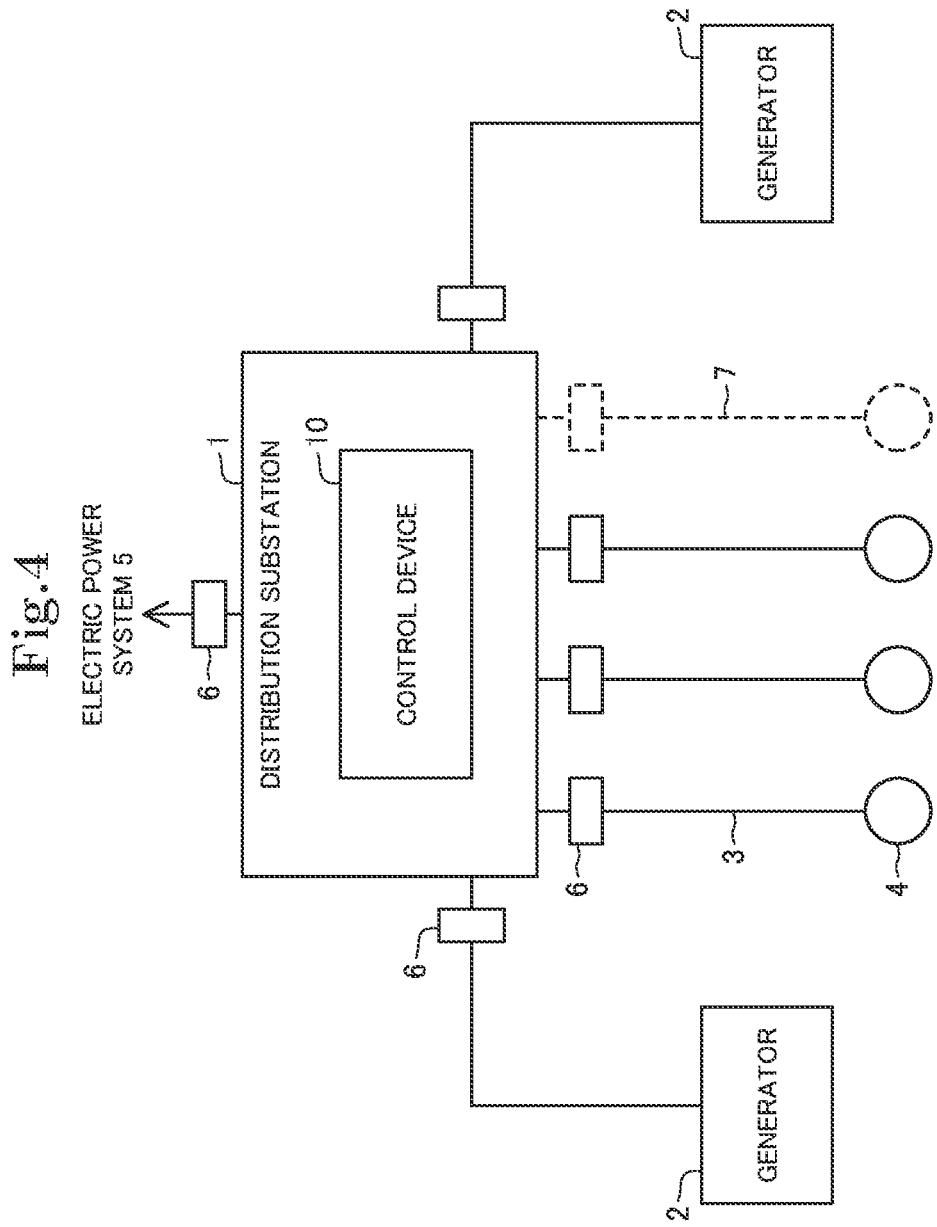
FIG. 4 is a diagram showing the appearance during operation of the electric power control system disclosed in FIG. 1A.
Figure 5:
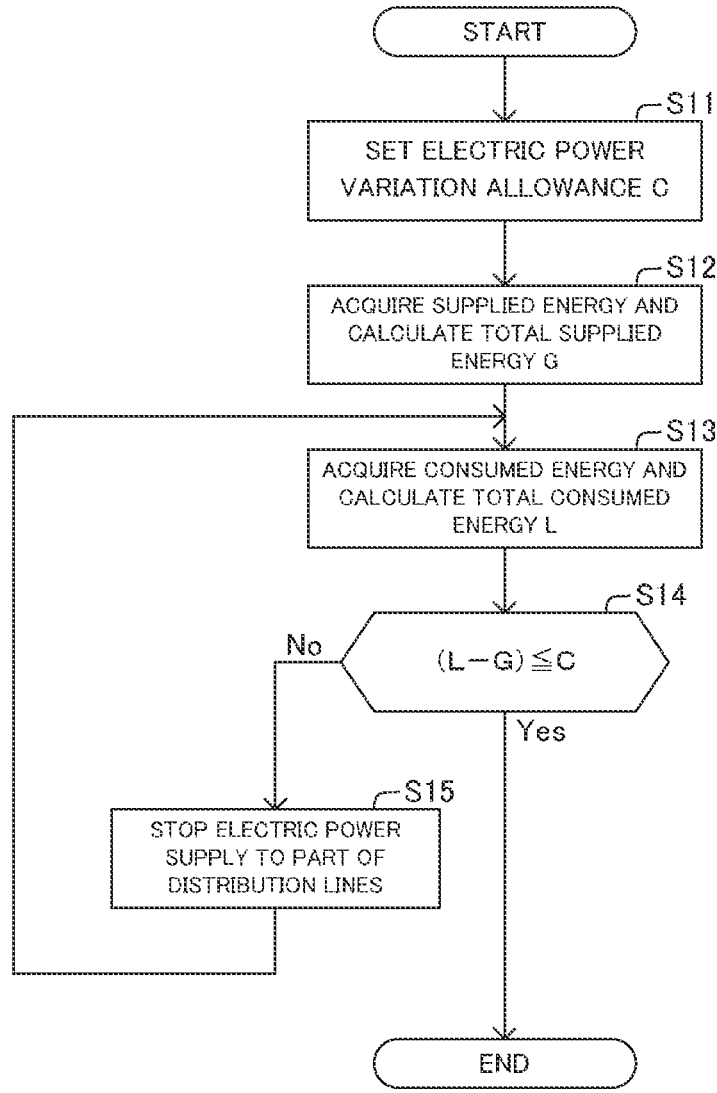
FIG. 5 is a flowchart showing the operation of the control device disclosed in FIG. 1A.

A first exemplary embodiment of the present invention will be described referring to FIGS. 1A to 5. FIGS. 1A, 1B and 2 are diagrams for describing the configuration of an electric power control system, and FIGS. 3 to 5 are diagrams for describing the operation thereof.

As shown in FIGS. 1A and 1B, an electric power control system according to the present invention is a system which controls electric power in an electric power system 5, and is built in a distribution substation 1 connected with the electric power system 5. One or a plurality of generators 2 which generate and supply electric power connects. For example, the generator 2 is a diesel generator, a solar generator, or the like. Thus, as shown in FIG. 1B, a given energy is supplied from the electric power system 5 and electric power generated by the generators 2 is also supplied to the distribution substation 1. In other words, the electric power system 5 and the one or plurality of generators 2 each function as an electric power supplying means which supplies electric power. As shown in FIG. 1A, each of the lines between the generators 2 and the distribution substation 1 and between the electric power system 5 and the distribution substation 1 connects to an electric power measuring instrument 6 such as a wattmeter which measures supplied energy.

Further, one or a plurality of loads (load means) 4 which receive the electric power and consume the electric power are connected to the distribution station 1. Each of the loads 4 is connected to the distribution substation 1 via a distribution line 3, and is usually a demander (consumer) or demanders (consumers). Moreover, as shown in FIG. 1A, the distribution line 3 with which each of the loads 4 connects to the electric power measuring instrument 6 such as a wattmeter which measures the load change of the connected load 4, namely, energy consumed by the connected load 4.

Although FIG. 1A shows an example in which two generators 2 and three loads 4 are connected to the distribution substation 1, more generators 2 and more loads 4 may be connected as shown in FIG. 1B, and the number of the generators 2 and the number of the loads 4 are not limited to those stated in the example shown in FIG. 1A. Moreover, although it was described above that each electric power measuring instrument 6 is mounted on each line, the electric power measuring instrument 6 may be mounted in a distribution substation, a generator, a load, an electric power storage device or the like, and may be mounted in any place.

The distribution substation 1 includes a control device 10 configuring an electric power control system controlling electric power. The control device 10 is configured as an information processing device including an arithmetic device and a storage device. To be specific, as shown in FIG. 2, the control device 10 includes a supplied energy acquisition part 11, a consumed energy acquisition part 12 and an electric power control part 13, which are structured by installation of a program into the arithmetic device (not shown in the figure). Moreover, the control device 10 includes a storage part 14 which stores information necessary for arithmetic processes by the respective parts 11, 12 and 13.

The supplied energy acquisition part 11 (a supplied energy acquiring means) acquires a supplied energy which is the amount of electricity generated by each of the generators 2 and a supplied energy of electric power supplied from the electric power system 5, and stores into the storage part 14. For example, the supplied energy acquisition part 11 can acquire energy actually generated by the generator 2 and energy actually supplied from the electric power system 5 by measuring with the electric power measuring instrument 6. Alternatively, information of the amount of generated electricity preset for each generator 2 and the amount of electric power supplied from the electric power system 5 may be stored in a storage part 10B or the like in advance, and the electric power measuring instrument 6 can acquire the information. A method by which the supplied energy acquisition part 11 acquires a supplied energy is not limited to the methods stated above. Further, in a case where a total supplied energy, which is the total of energy generated by the generators 2 and energy supplied from the electric power system 5 and is calculated in a manner to be described later, is set in advance, the supplied energy acquisition part 11 may acquire information of the total supplied energy.

The consumed energy acquisition part 12 (a consumed energy acquisition means) acquires energy consumed by each of the loads 4 and stores into the storage part 14. For example, the consumed energy acquisition part 12 acquires a consumed energy by reading a value measured by the electric power measuring instrument 6 mounted on the distribution line 3 to which the load 4 is connected. However, the consumed energy acquisition part 12 may acquire a value measured by another configuration mounted in the distribution substation 1 as a consumed energy, or may acquire by another method.

The electric power control part 13 (an electric power supply and demand control means) controls a supply and demand condition of electric power supplied from the electric power system 5 and the generators 2 and electric power consumed by the loads 4 on the basis of information of a supplied energy and a consumed energy acquired by the acquisition part 11 and the acquisition part 12, respectively, and stored in the storage part 14 as described above. In other words, depending on a total supplied energy which is the total of the acquired supplied energy and a total energy which is the total of the acquired consumed power, the electric power control part 13 executes control to change the condition of supply of electric power to the distribution lines where the loads 4 are connected. Below, together with the configuration of the electric power control part 13, a processing operation thereof will be described referring to flowcharts of FIGS. 3 and 5. As described later, FIG. 3 shows a case where a total supplied energy G is more than a total consumed energy L, and FIG. 5 shows a case where the total consumed energy L is more than the total supplied energy G.

First, the electric power control part 13 sets a predetermined electric power variation allowance C in consideration of a given electric power variation which can be managed by a distribution substation (step S1). The electric power variation allowance C is, as described later, a value representing a range in which an electric power supply and demand difference is allowed. An electric power supply and demand difference represents a difference between the total supplied energy G which is the total of supplied energy and the total consumed energy L which is the total of consumed energy. The electric power variation allowance C is inputted into the control device 10 by an operator and thereby stored into the storage part 14 by the electric power control part 13.

Next, as described above, the electric power control part 13 reads out from the storage part 14 the amount of electric power generated by the generators 2 and the amount of electric power supplied by the electric power system 5, which are acquired by the supplied energy acquisition part 11, and calculates the total supplied energy G which is the total of the above amounts (step S2). In other words, the electric power control part 13 calculates the total G of, when there are a plurality of generators 2, energy generated by all the generators 2 and energy supplied from the electric power system 5. Meanwhile, in a case where a total supplied energy is set and stored in the storage part 14 in advance, the control device 10 may acquire information of the total supplied energy.

Further, the electric power control part 13 acquires consumed energy of the loads 4 measured by the electric power measuring instruments 6 and stored into the storage part 14 by the consumed energy acquisition part 12 as described above, and obtains the total consumed energy L which is the total of the consumed energy (step S3). In other words, in a case where there are a plurality of loads 4, the electric power control part 13 calculates the total L of consumed energy of all the loads 4 connected to all the distribution lines 3 to which electric power is supplied from the distribution substation 1.

Next, the electric power control part 13 compares the total supplied energy G and the total consumed energy L, which are calculated in the abovementioned manner. To be specific, the electric power control part 13 calculates a supplied energy and demand difference (G–L) which represents the difference between the total supplied energy G and the total consumed energy L, and determines whether the electric power supply and demand difference (G–L) is equal to or less than the electric power variation allowance C or the electric power supply and demand difference (G–L) is more than the electric power variation allowance C (step S4). In a case where the electric power supply and demand difference (G–L) is equal to or less than the electric power variation allowance C (step S4: Yes), the electric power control part 13 does not change the current condition of electric power supply and demand.

On the other hand, in a case where the electric power supply and demand difference (G–L) is more than the electric power variation allowance C (step S4: No), the electric power control part 13 executes control to regulate the balance between electric power supply and demand. In this case, the total supplied energy G is more than the total consumed energy L by the electric power variation allowance C or more. That is, the surplus energy is equal to or more than the electric power variation allowance C. Therefore, the electric power control part 13 executes control to increase the consumed energy or decrease energy.

To be specific, the electric power control part 13 checks the presence or absence of the demand for electric power in another distribution line (see reference numeral 7 in FIG. 4) which can be connected to the distribution substation 1 (step S5). Then, in a case where there is no demand for electric power in the other distribution line 7 (step S5: No), the electric power control part 13 controls an electric power generation condition so as to decrease the energy generated by the generators 2 (step S6). For example, the electric power control part 13 instructs the generators 2 to decrease the energy generated thereby. Regarding the instruction, the electric power control part 13 may instruct the generators 2 in accordance with an instruction inputted by the operator to decrease electric power generation, or may automatically instruct the generators 2 in accordance with a preset criterion.

After that, the electric power control part 13 acquires the decreased amount of electric power generated by the generators 2 (step S2), and calculates the electric power supply and demand difference (G–L) and determines whether the difference falls within the range of the electric power variation allowance C again in the same manner as stated above. Then, the electric power control part 13 repeatedly executes the process described above so that the electric power supply and demand difference (G–L) becomes equal to or less than the electric power variation allowance C. In the process, when the demand for electric power in the other distribution line 7 is caused, electric power may be supplied to the load 4 connected to this new distribution line 7 as described later.

On the other hand, in a case where there is the demand for electric power in the other distribution line 7 (step S5: Yes), the electric power control part 13 additionally connects this new distribution line 7 demanding electric power as shown in FIG. 4, and executes control to supply electric power to the load 4 connected to this distribution line 7 (step S7). Then, the electric power control part 13 repeatedly executes the process described above so that the electric power supply and demand difference (G–L) becomes equal to or less than the electric power variation allowance C. In the process, when there is no more demand for electric power in the other distribution line 7, the electric power control part 13 may instruct the generators 2 to decrease electric power generation as stated above.

In the addition of a new distribution line 7 stated above, the electric power control part 13 and so on executes a process of measuring the maximum amount of a load connected to the new distribution line 7, or evaluating the maximum amount of the load on the basis of preset information to previously determine that the total consumed energy L after connection does not exceed the total supplied energy G. Moreover, after the addition of the new distribution line 7, the electric power control part 13 and so on return to the process of calculating the total consumed energy L (step S3), and execute the process of determining whether the difference between the total supplied energy G and the total consumed energy L is less than the electric power variation allowance C (step S4). In a case where the total consumed energy L is more than the total supplied energy G, the process transfers to an algorithm shown in FIG. 5 for control of the balance between electric power supply and demand when the total consumed energy L of the distribution lines is more than the total supplied energy G by more than the given electric power variation allowance C, and regulates the loads.

Next, the algorithm for control of the balance between electric power supply and demand when the total consumed energy L of the distribution lines 3 is more than the total supplied energy G by more than the given electric power variation allowance C will be described referring to FIG. 5.

First, in the same manner as described above, the electric power control part 13 sets a predetermined electric power variation allowance C in consideration of a given electric power variation which can be managed by a distribution substation (step S11). Then, the electric power control part 13 reads out from the storage part 14 energy generated by the generators 2 and energy supplied by the electric power system 5, which are acquired by the supplied energy acquisition part 11, and calculates the total supplied energy G which is the total of the generated energy and the supplied energy (step S12). Further, the electric power control part 13 acquires consumed energy of the loads 4 measured by the electric power measuring instruments 6 and stored into the storage part 14, and obtains the total consumed energy L which is the total of the consumed energy (step S13).

Next, the electric power control part 13 compares the total supplied energy G and the total consumed energy L, which are calculated in the abovementioned manner. To be specific, the electric power control part 13 calculates a supplied energy and demand difference (L–G) which represents the difference between the total consumed energy L and the total supplied energy G, and determines whether the electric power supply and demand difference (L–G) is equal to or less than the electric power variation allowance C or the electric power supply and demand difference (L–G) is larger than the electric power variation allowance C (step S14). In a case where the electric power supply and demand difference (L–G) is equal to or less than the electric power variation allowance C (step S14: Yes), the electric power control part 13 does not change the current condition of electric power supply and demand.

On the other hand, in a case where the electric power supply and demand difference (L–G) is more than the electric power variation allowance C (step S14: No), the electric power control part 13 executes control to regulate the balance between electric power supply and demand. In this case, the total consumed energy L is more than the total supplied energy G by the electric power variation allowance C or more. That is, the shortage of electric power is the electric power variation allowance C or more. Therefore, the electric power control part 13 executes control of decreasing the consumed energy.

To be specific, the electric power control part 13 executes control to stop supply of electric power to part of the distribution lines 3 connected to the distribution substation 1, that is, stop supply of electric power to the loads 4 connected to these distribution lines 3 (step S15). In the control, the electric power control part 13 may instruct the distribution lines 3 in accordance with an instruction inputted by the operator to stop electric power supply, or may automatically instruct the distribution lines 3 in accordance with a preset criterion.

After that, the electric power control part 13 again returns to the process of calculating the total consumed energy L (step S13) and executes the process of determining whether the difference between the total consumed energy L and the total supplied energy G is less than the electric power variation allowance C (step S14). Regarding the control, it is possible to shorten a time required for control by holding information of the loads 4 connected to the respective distribution lines 3 and stopping electric power supply while calculating the total consumed energy L on the basis of the information. Moreover, if the order of the distribution lines 3 to which electric power supply is stopped is determined in advance, the electric power control part 13 executes control to stop electric power supply in accordance with this order.

The "electric power variation allowance C" described above is a parameter which is determined by the loss in the electric power system 5 and the load variation capability of the generators 2. For example, in a case where the distribution substation 1 is connected with a distribution line 3 with much loss or connected with many generators 2 which need much time to regulate the electric power generation capacity, the electric power variation allowance C is set large. On the other hand, in a case where the electric power system 5 is configured by distribution lines 3 with little loss and generators 2 whose outputs are easily regulated, it is possible to set the electric power variation allowance C small, and it is possible to increase electric power generation efficiency. Further, it is possible to set the electric power variation allowance C to different values separately for when the total consumed energy L is more than the total supplied energy G and when the total consumed energy L is less than the total supplied energy G.

Second Exemplary Embodiment

Figure 6:
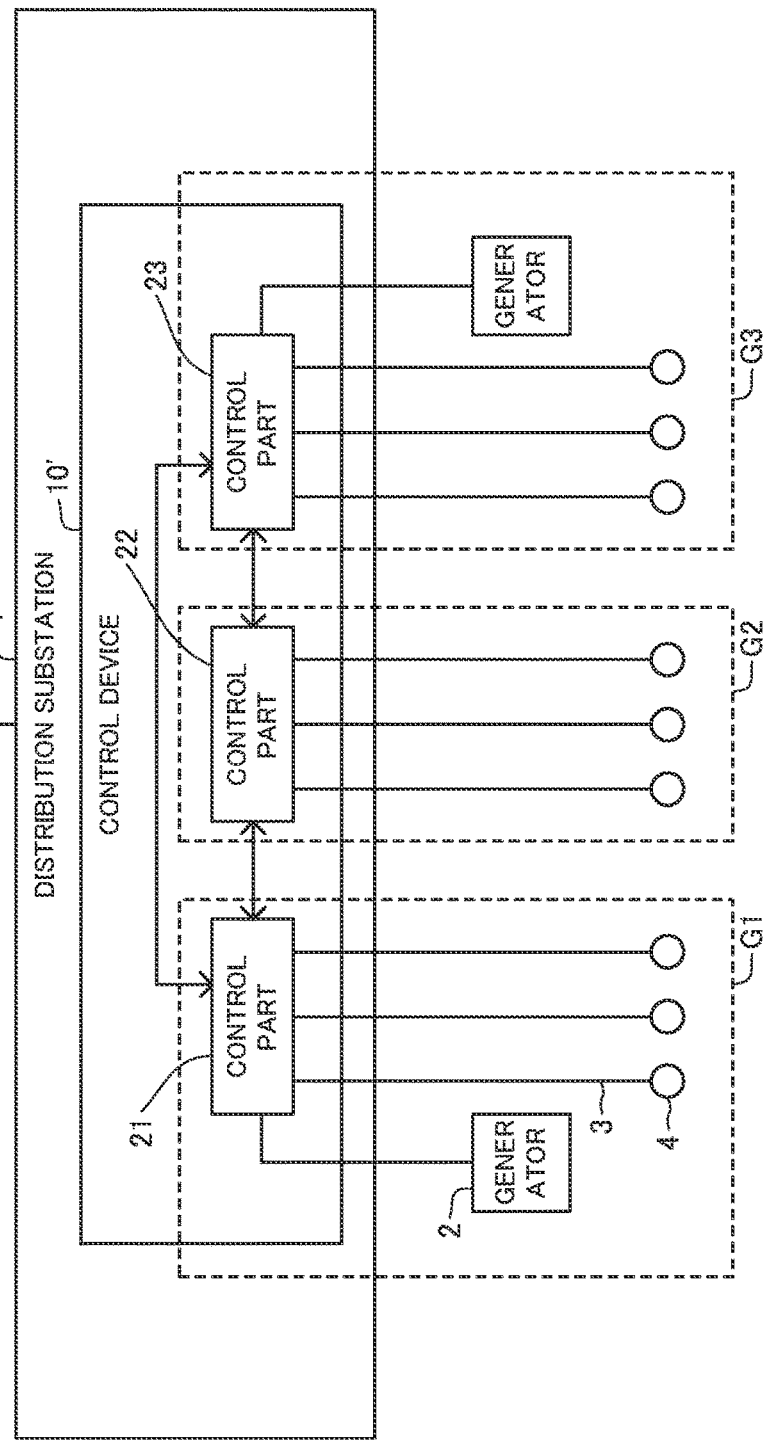
FIG. 6 is a block diagram showing a configuration of an electric power control system in a second exemplary embodiment of the present invention.
Figure 7:
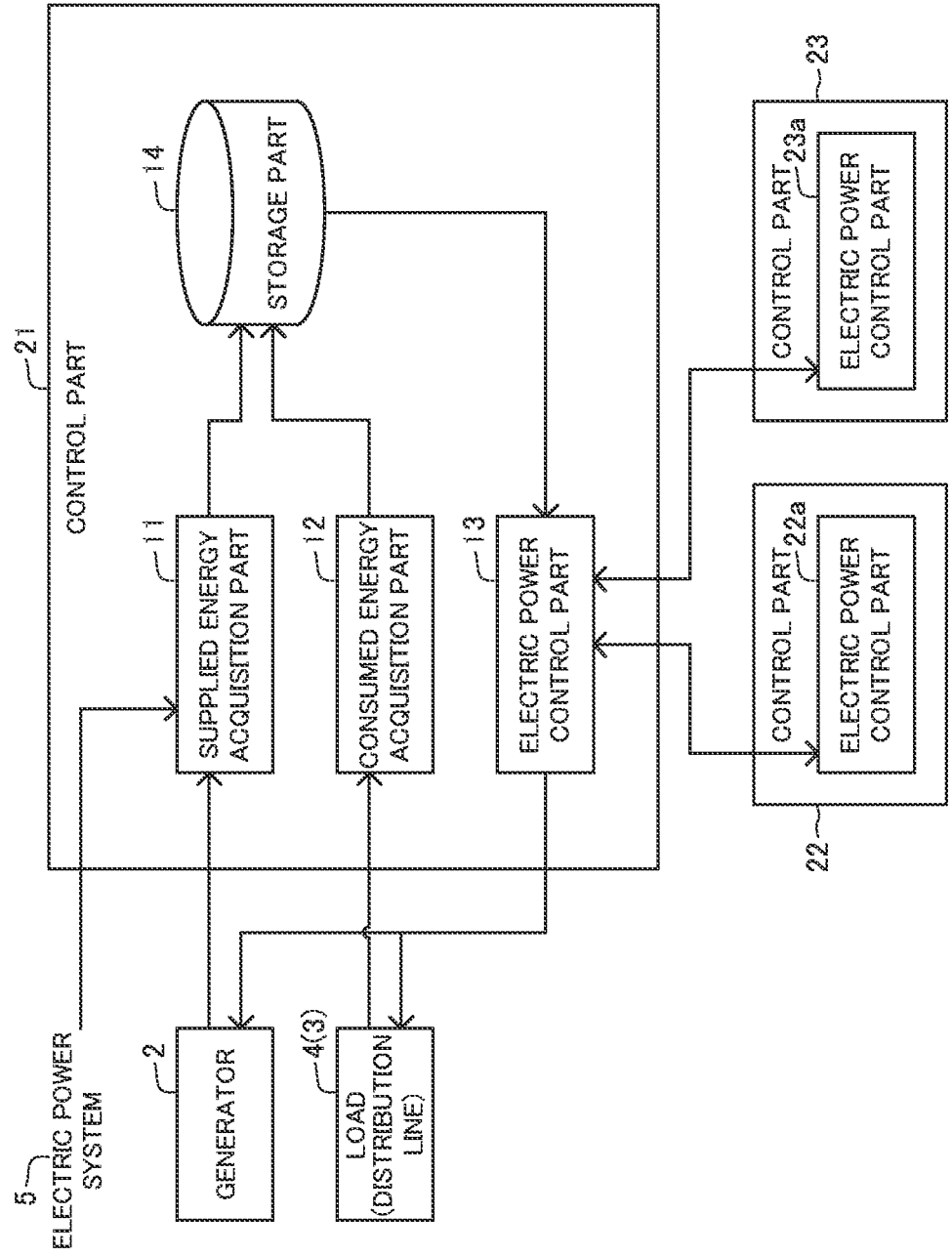
FIG. 7 is a block diagram showing the configuration of a control part disclosed in FIG. 6.
Figure 8:
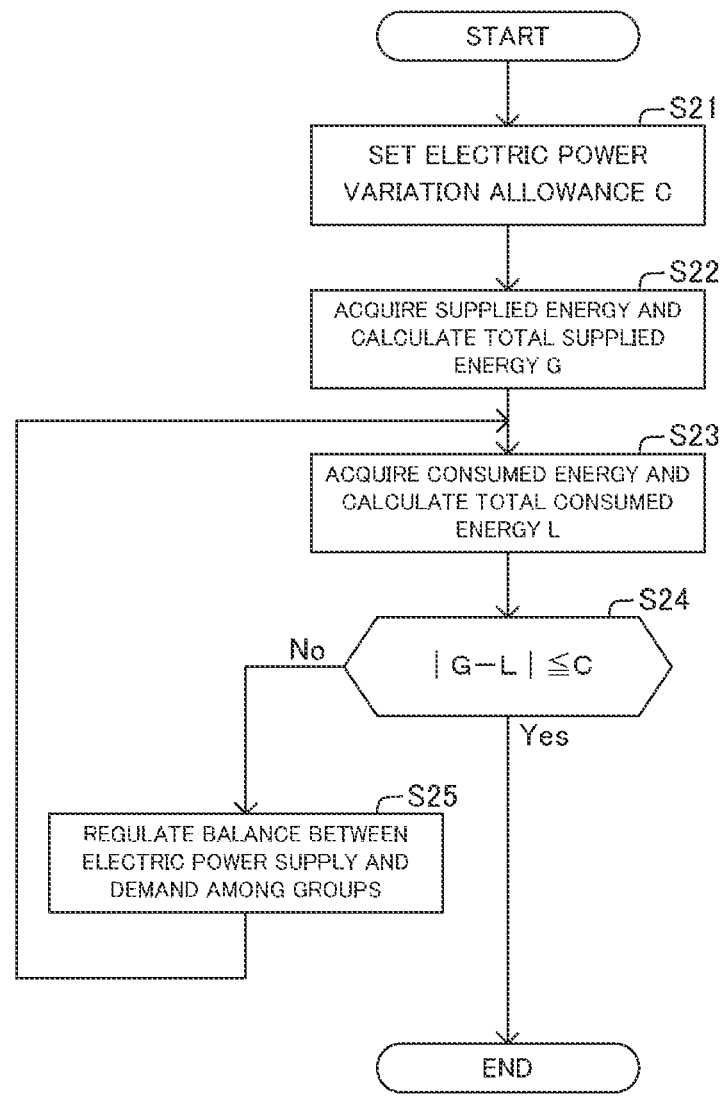
FIG. 8 is a flowchart showing the operation of the control part disclosed in FIG. 6.
Figure 9:
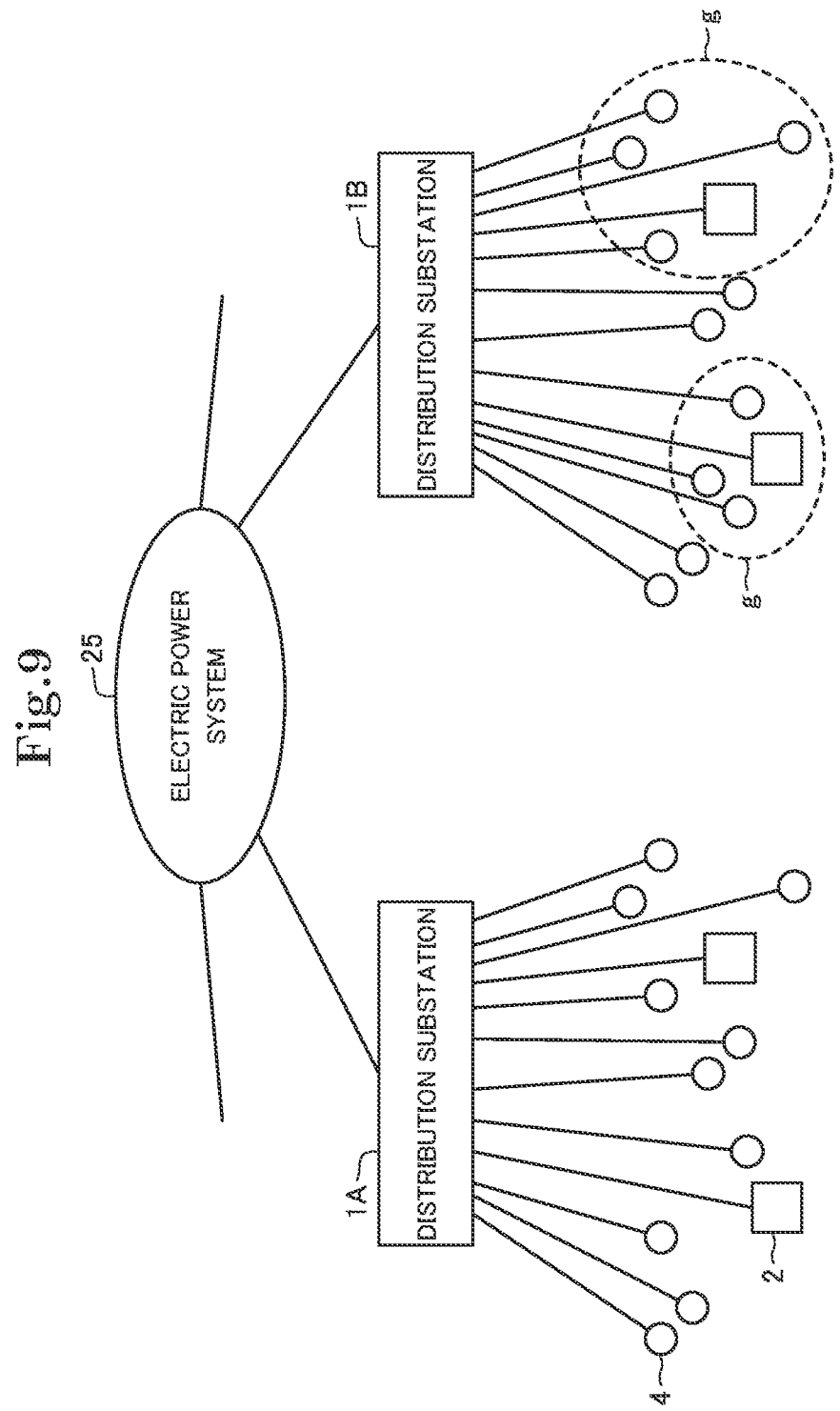
FIG. 9 is a block diagram showing another configuration of the electric power control system in the second exemplary embodiment of the present invention.

Next, a second exemplary embodiment of the present invention will be described referring to FIGS. 6 to 9. FIGS. 6 and 7 are diagrams for describing the configuration of an electric power control system, and FIGS. 8 and 9 are diagrams for describing the operation thereof.

In this exemplary embodiment, as described later, the electric power control part 13 changes a total supplied energy by transmitting or receiving electric power to or from another device depending on a total supplied energy which is the total of acquired supplied energy and a total consumed energy which is the total of acquired consumed energy. In particular, in a case where a supplied energy and demand difference (|G−L|) which is the difference between a total supplied energy G and a total consumed energy L calculated as described above does not fall within a predetermined electric power variation allowance C, the electric power control part 13 transmits or receives electric power to or from another device and carries out necessary electric power regulation. For example, as described in the following specific example, the electric power control part 13 may carry out regulation of energy between set groups, or may carry out regulation of energy in cooperation with an external electric power system.

To be specific, as shown in FIG. 6, the electric power control system in this exemplary embodiment is a system which controls electric power in an electric power system 15, and is built in the distribution substation 1 connected with the electric power system 15. To the distribution substation 1, the electric power system 15, one or a plurality of generators 2 which generate and supply electric power, and one or a plurality of loads 4 which consume electric power are connected.

The distribution substation 1 includes a control device 10' configuring an electric power control system controlling electric power, and the control device 10' in this exemplary embodiment includes a plurality of control parts 21, 22 and 23 corresponding to the control device 10 in the first exemplary embodiment described above. In the example shown in FIG. 6, the control device 10' includes three control parts 21, 22 and 23, but may include more control parts 21, 22, 23.

The control parts 21, 22 and 23 each have a similar configuration to the configuration that the control part 10 in the first exemplary embodiment has. In other words, as shown in FIG. 7, the control part 21 includes the supplied energy acquisition part 11, the consumed energy acquisition part 12, the electric power control part 13, and the storage part 14. As the components of the other control parts 22 and 23, only electric control parts 22a and 23a are shown in FIG. 7, respectively, but the control parts 22 and 23 also include other components in the same manner as the control part 21.

Further, as shown in FIG. 6, the control parts 21, 22 and 23 belong to preset groups G1, G2 and G3, respectively. With this, the generator 2 and the distribution line 3 to which the load 4 is connected belong to each of the groups G1, G2 and G3. Consequently, each of the control parts 21, 22 and 23 is configured to manage, as a controlled object, the generator 2 and the distribution line 3 (the load 4) which belong to the same group as the control part itself. In other words, the electric control part 13 in each of the control parts 21, 22 and 23 controls the condition of supply and demand between electric power generated by the generator 2 belonging to the same group and also supplied from the electric power system 15 and electric power consumed by the load 4, on the basis of the total supplied energy G and the total consumed energy L as described above.

Further, each of the control parts 21, 22 and 23 in this exemplary embodiment is connected to the other control part (the other device) belonging to the different group as shown in FIGS. 6 and 7. Then, each of the electric power control parts 13, 22a and 23a of the control parts 21, 22 and 23 also has a function of controlling an electric power supply and demand condition in cooperation with each other. An example will be described referring to a flowchart of FIG. 8.

First, in the same manner as described above, the electric power control part 13 sets a predetermined electric power variation allowance C in consideration of a given electric power variation which can be managed by a distribution substation (step S21). Then, the electric power control part 13 reads out from the storage part 44 the energy generated by the generators 2 and the energy supplied by the electric power system 15, which are acquired by the supplied energy acquisition part 11, and calculates a total supplied energy G which is the total of these amounts (step S22). Further, the electric power control part 13 acquires consumed energy of the loads 4 measured by the electric power measuring instruments 6 and stored into the storage part 14, and obtains a total consumed energy L which is the total of these consumed energy (step S23).

Next, the electric power control part 13 compares the total supplied energy G and the total consumed energy L, which are calculated in the abovementioned manner. To be specific, the electric power control part 13 calculates a supplied energy and demand difference (|G−L|) which represents the difference between the total supplied energy G and the total consumed energy L, and determines whether the electric power supply and demand difference (|G−L|) is equal to or less than the electric power variation allowance C or the electric power supply and demand difference (|G−L|) is more than the electric power variation allowance C (step S24). In a case where the electric power supply and demand difference (|G−L|) is equal to or less than the electric power variation allowance C (step S24: Yes), the electric power control part 13 does not change the current condition of electric power supply and demand.

On the other hand, in a case where the electric power supply and demand difference (|G−L|) is more than the electric power variation allowance C (step S24: No), the electric power control part 13 executes control to regulate the balance between electric power supply and demand among the groups (step S25). For example, in a case where the total supplied energy G in its group is more than the total consumed energy L, the group has excess electric power. Therefore, the electric power control part 13 executes control to act as a generator which supplies electric power to the other group. Moreover, in a case where the total consumed energy L in its group is more than the total supplied energy G, the group has insufficient electric power. Therefore, the electric power control part 13 executes control to act as a load supplied with electric power from the other group.

The electric power control part 13 thus controls so that the difference between a total supplied energy and a total consumed energy in each group falls within a predetermined electric power variation allowance C as in the first exemplary embodiment. Consequently, it becomes possible to regulate the balance between electric power supply and demand among groups without placing a heavy burden on a generator of a specific group.

Further, in a case where the total consumed energy L in its group is more than the total supplied energy G, the group has insufficient electric power. Therefore, the electric power control part 13 may execute control to stop supply of electric power to the distribution lines 3 with the loads 4 belonging to its group connected and make these distribution lines 3 belong to the other group having excess electric power. In other words, in a case where the total supplied energy G in its group is more than the total consumed energy L, the electric power control part 13 may execute control to additionally connect the distribution lines 3 with the loads 4 belonging to the other group connected, to the group of the electric power control part 13. The electric power control part 13 may thus control so that the difference between a total supplied energy and a total consumed energy in each group falls within a predetermined electric power variation allowance C as in the first exemplary embodiment.

The system shown in FIG. 6 may have a function of, when electric power supply from the electric power system 15 to the distribution substation 1 stops, causing the generators 2 to independently supply electric power to the distribution lines 3 or causing controlled objects such as the generators 2 and the loads 4 managed in the separate groups to supply electric power to the distribution lines 3 in cooperation with each other. Consequently, even if the electric power system 15 stops supply of electric power for a reason such as overload, the electric power control part 13 can keep supplying constant electric power to the loads 4 in the distribution substation 1.

The distribution substation 1 described above and the system which controls the balance between electric power supply and demand have self-similarity. Therefore, by applying controlled objects such as the generators 2 and the loads 4 stated above or controlled objects managed in separate groups g to an electric power system 25 including a plurality of distribution substations 1A and 1B as shown in FIG. 9, it is possible to build a system which executes electric power control so that the sum of electric power supplies in the respective distribution substations 1A and 1B becomes the minimum.

In FIG. 9, the distribution substations 1A and 1B are connected to the large-scale electric power system 25. In this configuration, when one of the distribution substations 1A and 1B falls into a power shortage situation, it can be supplied with electric power via the large-scale electric power system 25. Moreover, when requested, any of the distribution substation 1A and 1B having surplus electric power can supply electric power to the large-scale electric power system. Consequently, electric power supplies in the respective distribution substations 1A and 1B can be minimized, and then, control to make the sum of the electric power supplies minimum can be executed.

Thus, according to the present invention, a small-scale electric power system including a plurality of generators and loads is configured, the total of electric power generated by all the generators included in the system and electric power supplied from an electric power system and the total of consumptions by all the loads are measured, and the energy generated by each of the generators and the loads are regulated depending on the degree of excess and deficiency. Therefore, firstly, fine regulation of each of the generators is not necessary, and therefore, regulation of the balance between electric power supply and demand in the system is enabled at low cost and by a simple control method. Secondly, the balance between supply and demand is regulated by using the electric power system of the present invention and the controllable groups in the electric power system as control units, and the regulation method basically has self-similarity and does not depend on the number of the generators or the total amount of the loads. Accordingly, it is easy to hierarchically build an electric power system, and its high scalability enables flexible configuration of an electric power system.

Third Exemplary Embodiment

Figure 11:
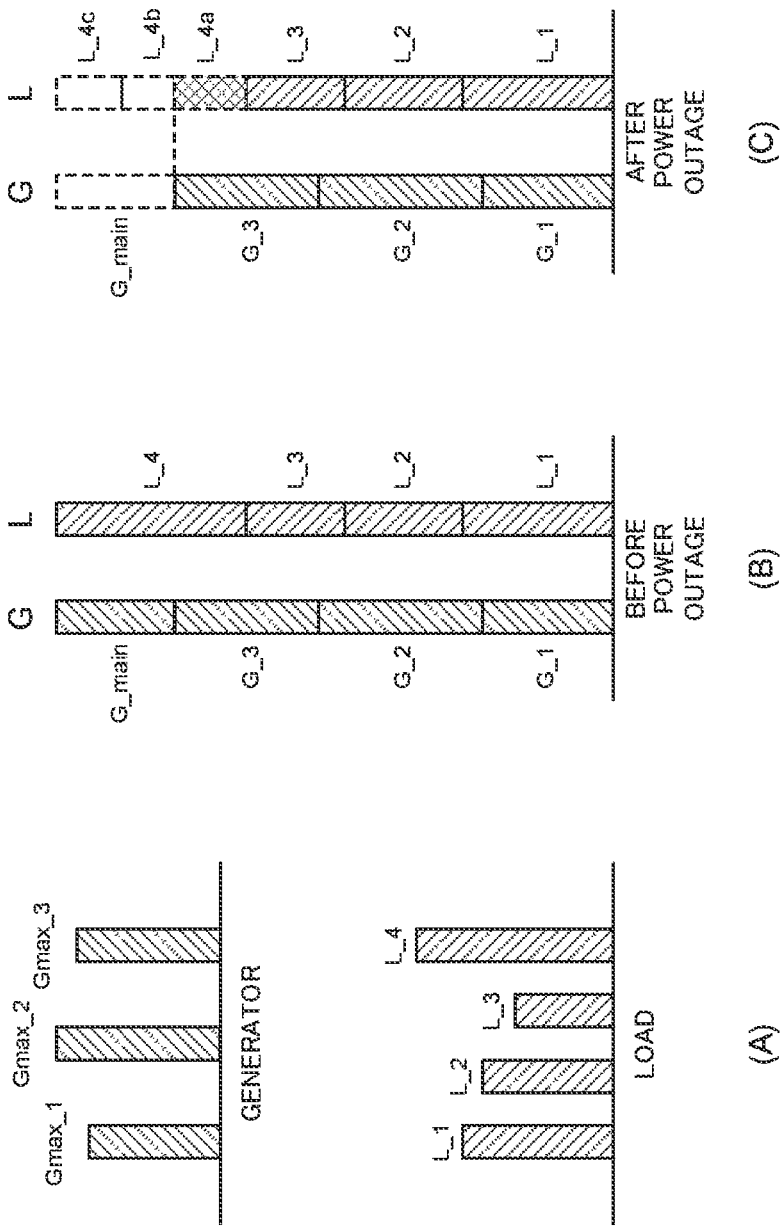
FIG. 11 is a diagram showing the state of electric power in the electric power control system in the third exemplary embodiment of the present invention.
Figure 12:
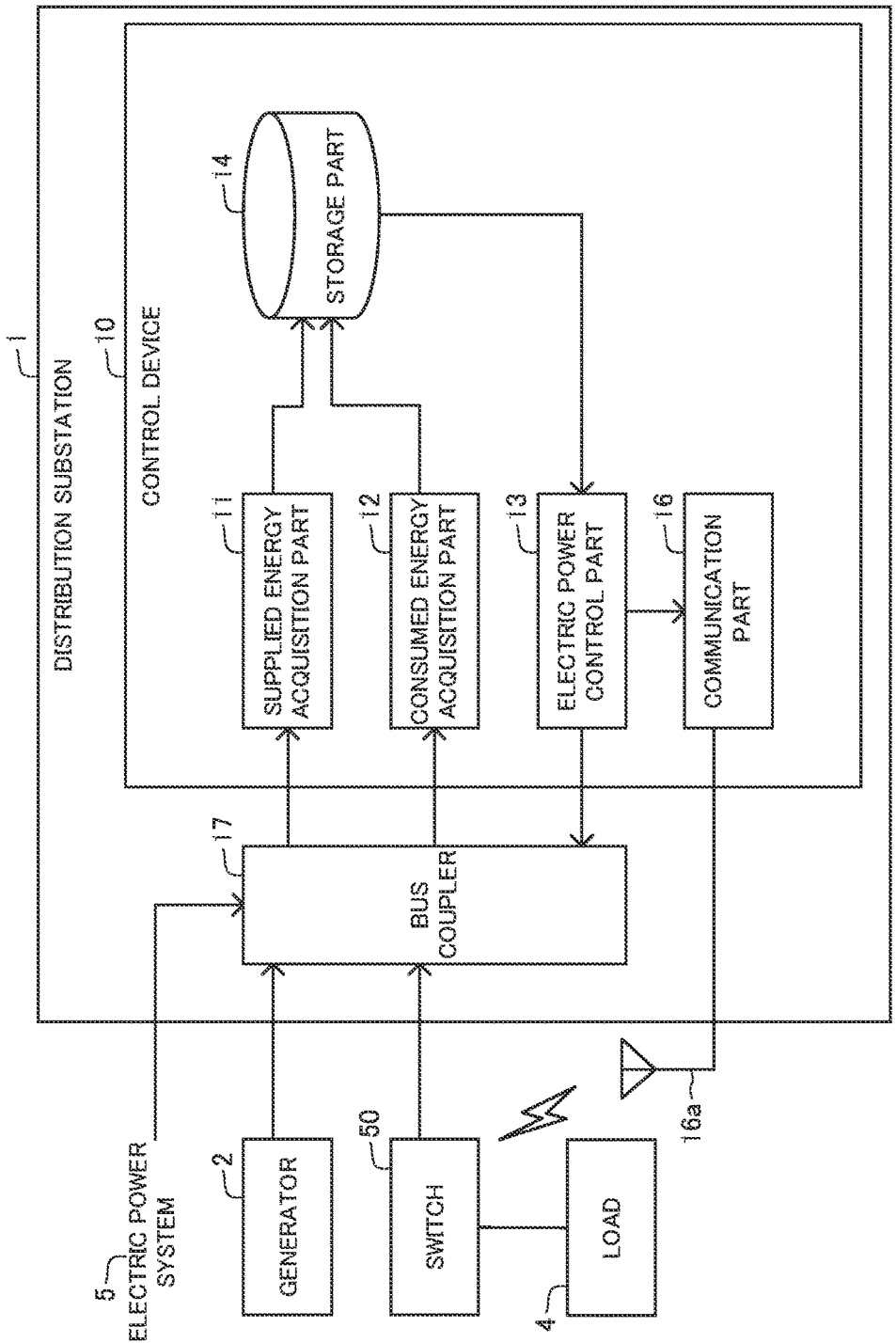
FIG. 12 is a block diagram showing the configuration of a control device configuring the electric power control system in the third exemplary embodiment of the present invention.

A third exemplary embodiment of the present invention will be described referring to FIGS. 10 to 21. FIGS. 10 and 11 are diagrams showing the state of energy in an electric power control system. FIG. 12 is a diagram showing the configuration of a control device configuring the electric power control system. FIGS. 13 to 21 are diagrams showing an example of the configuration of the electric power control system and the operation thereof.

First, referring to FIGS. 10 and 11, the state of control of electric power supply and demand will be described. The electric power control system in this exemplary embodiment is a system which controls electric power in the electric power system 5 as described in the first exemplary embodiment. To the distribution substation 1, the electric power system 5 and the generators 2 each serving as an electric power supplying means and the loads 4 each serving as a load means are connected as shown in FIG. 1B. Consequently, to the distribution substation 1, the sum of a given energy G_main of electric power from the electric power system 5 and generated energy G_1 to G_m of electric power generated by the generators 2 is supplied as shown in FIG. 10(B). Moreover, from the distribution substation 1, the sum of energy L_1 to L_m of electric power to be consumed by the respective loads 4 is supplied to the respective loads 4 as shown in FIG. 10(B). In FIG. 10(B), a total supplied energy G which is the total of supplied energy is identical to a total consumed energy L which is the total of consumed energy, which shows a state in which electric power supply and demand are balanced.

In the configuration described above, for example, assuming supply of electric power G_main from the electric power system 5 stops as shown in FIG. 10(C) and supply of electric power to the load 4 with consumed energy L_4 is stopped so that a supplied energy and demand difference which is the difference between the total supplied energy G and the total consumed energy L falls within a given range as mentioned above, the balance between supply and demand of the total supplied energy G and the total consumed energy L is not achieved and generated electric power is wasted by an amount denoted by symbol F as shown in FIG. 10(C). Such a problem may occur, for example, when the loads 4 are uncoupled in unit of the distribution line 3 and the total of consumed energy by the loads 4 connected to this distribution line 3 is large.

Thus, it is desirable to execute control to stop supply of electric power to only the loads with consumed energy L_4b and L_4c and supply electric power to only the load with consumed energy L_4a corresponding to the generated energy denoted by symbol F as shown in FIG. 11(C). Therefore, in this exemplary embodiment, in order to realize a state as shown in FIG. 11(C), the system is configured to be capable of setting in detail the unit of the loads to which supply of electric power is stopped. Below, the electric power control system in this exemplary embodiment will be described in detail.

First, the distribution substation 1 in this exemplary embodiment includes a bus coupler 17 which can connect a plurality of distribution lines 3 as shown in FIG. 12. Then, the electric power system 5, the generator 2 and the load 4 are connected to the distribution line 3 connected to the bus coupler 17. Consequently, as in the other exemplary embodiments described above, the distribution substation 1 accepts supply of electric power from the electric power system 5 and the generator 2, and supplies electric power to the load 4.

Figure 13:
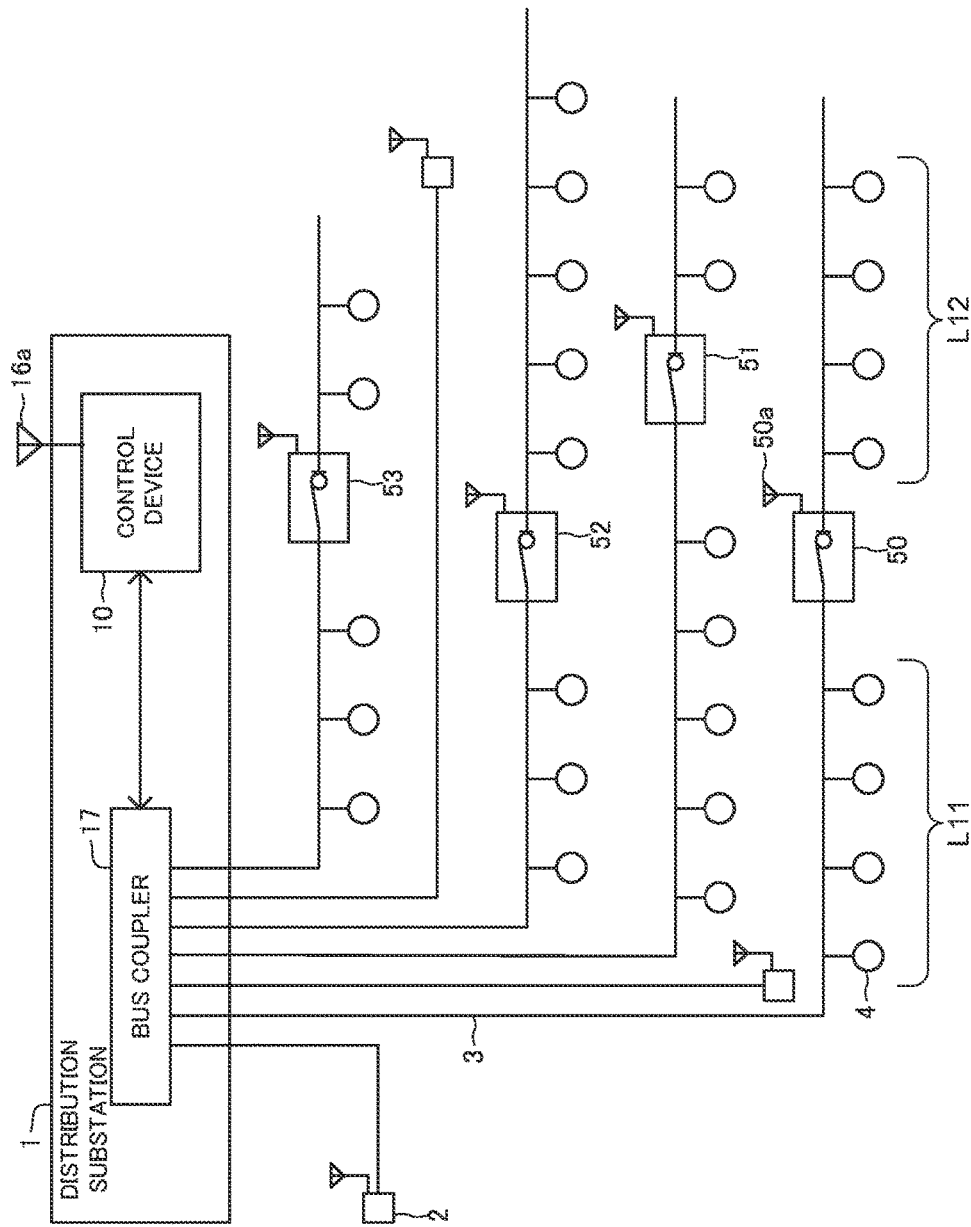
FIG. 13 is a diagram showing an example of the configuration of the electric power control system in the third exemplary embodiment of the present invention.

In a first example in this exemplary embodiment, as shown in FIG. 13, a plurality of loads 4 are connected to each of the distribution lines 3 to which the loads 4 are connected. Among the loads 4 connected on the same distribution line 3, a switch 50, 51, 52, 53 which switches the distribution line 3 between connected and disconnected is placed. In other words, when the switch 50, 51, 52, 53 is in the connected state is when electric power can be transmitted to the whole distribution line 3. On the other hand, when the switch 50, 51, 52, 53 is in the disconnected state is when electric power can be transmitted up to the switch on the distribution line but electric power cannot be transmitted downstream from the switch.

Further, each of the switches 50, 51, 52 and 53 includes a wireless communication device 50a and operates so as to switch the distribution line 3 between connected and disconnected in response to a command via wireless communication from the control device 10. Meanwhile, each of the switches 50, 51, 52 and 53 need not include the wireless communication device 50a and may receive a command from the control device 10 via wired communication. As shown in FIG. 13, the generator 2 also includes a wireless communication device and regulates the generated energy in response to a command from the control device 10.

Further, the control device 10 in this exemplary embodiment includes the supplied energy acquisition part 11, the consumed energy acquisition part 12, the electric power control part 13 and a communication part 16 as shown in FIG. 12. Moreover, the communication part 16 transmits control commands to the switch 50 and the generator 2 via an antenna 16a.

To be specific, the electric power control part 13 first calculates a supplied energy and demand difference which is the difference between the total of supplied energy from the electric power system 5 and the generator 2 and the total of consumed energy by the loads 4 as described above. Then, the electric power control part 13 controls the state of supply and demand of electric power so that the electric power supply and demand difference falls within the range of the electric power variation allowance C. When executing control to stop supply of electric power to the loads 4, the electric power control part 13 outputs a command to disconnect the switch 50, 51, 52, 53 to the communication part 16. The communication part 16 transmits the disconnection command to the switch 50, 51, 52, 53 via wireless communication and, upon receiving the command, the switch 50, 51, 52, 53 disconnects the distribution line 3 on which it is placed. Moreover, the electric power control part 13 may transmit a command to connect the switch 50, 51, 52, 53 depending on the electric power supply and demand difference.

Furthermore, for stopping supply of electric power to all the loads 4 connected to a single distribution line 3, the electric power control part 13 outputs a command to stop supply of electric power to the specific distribution line 3 to the bus coupler 17.

Figure 14:
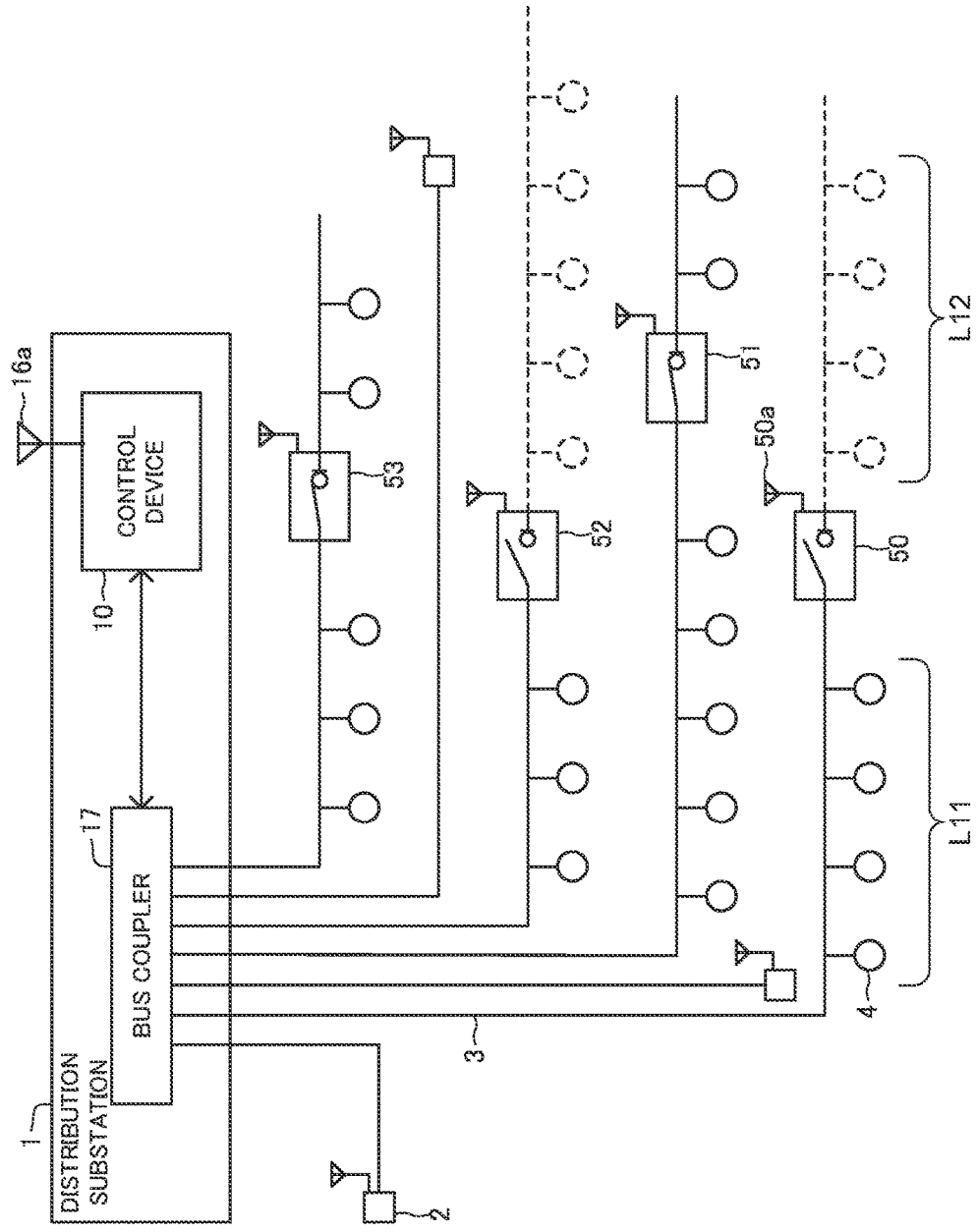
FIG. 14 is a diagram showing an example of the configuration of the electric power control system in the third exemplary embodiment of the present invention.

Now referring to FIGS. 13 and 14, an example of the operation of stopping electric power supply to the load 4 will be described. First, in the state shown in FIG. 13, all the switches 50, 51, 52 and 53 are in the connected state, and therefore, all the loads 4 are supplied with electric power. After that, as stated above, due to decrease of a supplied energy, stop of electric power supply to part of the loads 4 is determined depending on an electric power supply and demand difference, and a disconnection command is outputted to the switches denoted by reference numerals 50 and 52. Then, as shown with dotted lines in FIG. 14, electric power supply to the loads 4 located downstream from the respective switches 50 and 52 is stopped. To be specific, as shown in FIG. 14, electric power is supplied to loads denoted by symbol L11 located upstream from the switch 50 among the loads 4 connected on the same distribution line 3, whereas electric power supply to loads denoted by symbol L12 located downstream from the switch 50 is stopped.

Thus, according to this exemplary embodiment, by controlling the status of connection of the switch 50 or the like placed on the distribution line 3, the status of electric power supply to the distribution line 3 to which the loads 4 are connected can be changed, and electric power supply to part of the loads on the distribution line 3 can be stopped.

Therefore, a consumed energy can be regulated in detail by connecting/disconnecting the loads 4. As a result, it is possible to execute proper control to make an electric power supply and demand difference fall within a given range, and it is possible to reduce the waste of supply of electric power.

Figure 15:
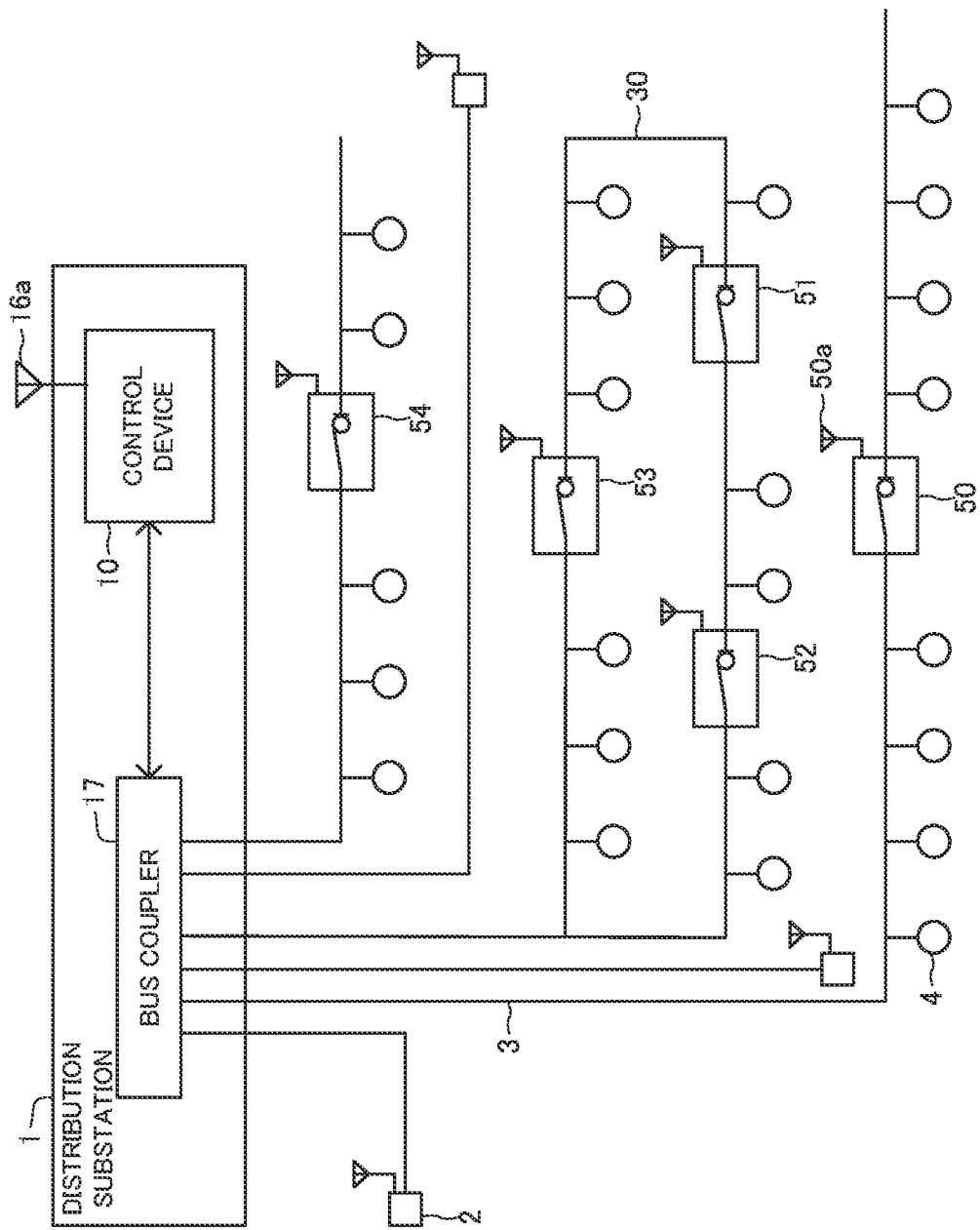
FIG. 15 is a diagram showing an example of the configuration of the electric power control system in the third exemplary embodiment of the present invention.

Next, a second example in this exemplary embodiment will be described referring to FIGS. 15 to 17. In this example, as shown in FIG. 15, a single distribution line 30 to which a plurality of loads 4 are connected is formed like a loop. On this loop-shape distribution line 30, three switches 51, 52 and 53 are placed. Meanwhile, the number of the switches 51, 52, 53 is not limited to three.

In the state shown in FIG. 15, the three switches 51, 52 and 53 are in the connected state on the loop-shape distribution line 30, and therefore, all the loads 4 on the distribution line 30 are supplied with electric power. Assuming a consumed energy then decreases and it is determined to stop electric power supply to part of the loads 4 depending on an electric power supply and demand difference as stated above, when a disconnection command is outputted to the switches denoted by reference numerals 51 and 53, electric power supply to the loads 4 located between the switches 51 and 53 is stopped as shown with a dotted line in FIG. 16. On the other hand, when a disconnection command is outputted to the switches denoted by reference numerals 51 and 52, electric power supply to the loads 4 located between the switches 51 and 52 is stopped as shown with a dotted line in FIG. 17.

Thus, according to the second example in this exemplary embodiment, it is possible with a simple configuration to set the status of supply of electric power to the loads to various statuses. In other words, it is possible to regulate a consumed energy in detail by connecting/disconnecting the loads 4. As a result, it is possible to properly control so that an electric power supply and demand difference falls within a given range, and it is possible to reduce the waste of supply of electric power.

Next, a third example in this exemplary embodiment will be described referring to FIGS. 18 and 19. In this example, as shown in FIG. 18, double distribution lines 31 and 32 are connected to the bus coupler 17. The loads 4 are configured to be able to be connected to either or both of the double distribution lines 31 and 32. For example, consumers corresponding to the loads 4 are connected to either or both of the distribution lines 31 and 32 depending on the conditions of supply of electric power (electricity rate, stability, and so on).

The electric power control part 13 in this exemplary embodiment outputs a command to stop electric power supply to either of the double distribution lines 31 and 32 to the bus coupler 17 so that an electric power supply and demand difference falls within the range of the electric power variation allowance C. Upon accepting such a command, the bus coupler 17 operates to stop electric power supply to the designated distribution line.

To be specific, firstly, in the state shown in FIG. 18, electric power is supplied to both the double distribution lines 31 and 32, and all the loads (for examples, reference numerals 41 to 45) are supplied with the electric power. Assuming a supplied energy then decreases and it is determined to stop electric power supply to part of the loads 4 depending on an electric power supply and demand difference as stated above, by stopping electric power supply to the distribution line denoted by reference numeral 32, electric power supply to the loads denoted by reference numerals 43, 44 and 45 is stopped as shown with a dotted line in FIG. 19. Because electric power supply to the distribution line denoted by reference numeral 31 is continued, electric power supply to the loads denoted by reference numerals 41 and 42 is continued.

Thus, according to the third example in this exemplary embodiment, it is possible with a simple configuration to set the status of electric power supply to the loads to various statuses. In other words, it is possible to regulate a consumed energy in detail by connecting/disconnecting the loads 4. As a result, it is possible to execute proper control to make an electric power supply and demand difference fall within a given range, and it is possible to reduce the waste of supply of electric power.

Next, a fourth example in this exemplary embodiment will be described referring to FIGS. 20 and 21. In this example, as shown in FIG. 20, a plurality of loads 4 are connected to a single distribution line 3, and a switch 60 as described above is placed between the distribution line 3 and each of the loads 4. For example, this switch 60 is equipped with a wireless communication device as described above, and can receive a connection/disconnection command from the control device 10.

Assuming a supplied energy decreases and it is determined to stop electric power supply to part of the loads 4 depending on an electric power supply and demand difference as stated above, by outputting a disconnection command to a given switch, electric power supply to the loads shown with a dotted line in FIG. 21 is stopped, for example.

Thus, according to the fourth example in this exemplary embodiment, it is possible with a simple configuration to set the status of electric power supply to the loads to various statuses. In other words, it is possible to regulate a consumed energy in detail by connecting/disconnecting the loads 4. As a result, it is possible to execute proper control to make an electric power supply and demand difference fall within a given range, and it is possible to reduce the waste of electric power supply.

Further, in the exemplary embodiment described above, the order of priority of loads may be decided in advance, and a load to which electric power supply is continued or stopped may be decided on the basis of the order of priority. To be specific, the order of priority of loads may be decided in accordance with the conditions of contracts with users, or may be decided in accordance with the importance of the loads. For example, the electric power control part 13 executes control to stop supply of electric power to a load of low importance so that an electric power supply and demand difference falls within the range of the electric power variation allowance C.

Furthermore, an example of a favorable method for controlling to supply electric power to a load and stop electric power supply is as follows. An operator with responsibility for supply has a control policy and, on the basis of the control policy, it is possible to execute control to supply electric power to a load and stop electric power supply.

<Supplementary Notes>

The whole or part of the exemplary embodiments disclosed above can be described as the following supplementary notes. The overview of the configurations of an electric power control system, a computer program and an electric power control method according to the present invention will be described below. However, the present invention is not limited to the following configurations.

(Supplementary Note 1-1)

An electric power control system connected to an electric power supplying means for supplying electric power and a load means for accepting supply of electric power and consuming the electric power, the electric power control system comprising:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for changing a status of supply of electric power to a distribution line with the load means connected depending on a total supplied energy and a total consumed energy, the total supplied energy being a total of the acquired supplied energy, and the total consumed energy being a total of the acquired consumed energy.

(Supplementary Note 1-2)

The electric power control system according to Supplementary Note 1-1, wherein the electric power supply and demand controlling means calculates an electric power supply and demand difference representing a difference between the total supplied energy and the total consumed energy, changes a status of supply of electric power to the distribution line with the load means connected, and executes control so that the electric power supply and demand difference falls within a predetermined range set in advance.

(Supplementary Note 1-3)

The electric power control system according to Supplementary Note 1-2, wherein when a value as a result of subtracting the total supplied energy from the total consumed energy is larger than a preset value, the electric power supply and demand controlling means changes a status of supply of electric power to the distribution line so as to stop supply of electric power to some of load means supplied with electric power, and makes the electric power supply and demand difference fall within a predetermined range set in advance.

(Supplementary Note 1-4)

The electric power control system according to Supplementary Note 1-3, wherein the electric power supply and demand controlling means executes control to stop supply of electric power to at least part of the distribution line with the load means connected, and makes the electric power supply and demand difference fall within a predetermined range set in advance.

(Supplementary Note 1-5)

The electric power control system according to Supplementary Note 1-4, wherein the electric power supply and demand controlling means controls a switch, and makes the electric power supply and demand difference fall within a predetermined range set in advance, the switch being placed in middle of the distribution line with the load means connected, and the switch switching the distribution line between connected and disconnected.

(Supplementary Note 1-6)

The electric power control system according to Supplementary Note 1-5, wherein the electric power supply and demand controlling means controls a plurality of switches placed on a same distribution line formed into a loop shape, and makes the electric power supply and demand difference fall within a predetermined range set in advance.

(Supplementary Note 1-7)

The electric power control system according to any one of Supplementary Notes 1-4 to 1-6, wherein the electric power supply and demand controlling means executes control to stop supply of electric power to one of double distribution lines, and makes the electric power supply and demand difference fall within a predetermined range set in advance, the double distribution lines being distribution lines to which a same load means can be connected.

(Supplementary Note 1-8)

The electric power control system according to any one of Supplementary Notes 1-2 to 1-7, wherein when a value as a result of subtracting the total consumed energy from the total supplied energy is larger than a preset value, the electric power supply and demand controlling means executes control to supply electric power to a new distribution line with a new load means connected, and makes the electric power supply and demand difference fall within a predetermined range set in advance.

(Supplementary Note 1-9)

The electric power control system according to any one of Supplementary Notes 1-2 to 1-8, comprising a plurality of electric power supply and demand controlling means, the electric power supply and demand controlling means each belonging to any of groups determined in advance, and the electric power supply and demand controlling means each targeting the electric power supplying means and/or the load means set to belong to its group for control of electric power supply and demand, wherein the electric power supply and demand controlling means each supply electric power to a distribution line to which the load means belonging to another of the groups is connected, and/or stops supply of electric power to a distribution line to which the load means belonging to its group is connected, and makes the electric power supply and demand difference in its group fall within a predetermined range set in advance.

(Supplementary Note 1-10)

A computer program comprising instructions for causing an information processing device, which is connected to an electric power supplying means for supplying electric power and a load means for accepting supply of electric power and consuming the electric power, to realize:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for changing a status of supply of electric power to a distribution line with the load means connected depending on a total supplied energy and a total consumed energy, the total supplied energy being a total of the acquired supplied energy, and the total consumed energy being a total of the acquired consumed energy.

(Supplementary Note 1-11)

The computer program according to Supplementary Note 1-10, wherein the electric power supply and demand controlling means calculates an electric power supply and demand difference representing a difference between the total supplied energy and the total consumed energy, changes a status of supply of electric power to the distribution line with the load means connected, and executes control so that the electric power supply and demand difference falls within a predetermined range set in advance.

(Supplementary Note 1-12)

The computer program according to Supplementary Note 1-11, wherein when a value as a result of subtracting the total supplied energy from the total consumed energy is larger than a preset value, the electric power supply and demand controlling means changes a status of supply of electric power to the distribution line so as to stop supply of electric power to some of load means supplied with electric power, and makes the electric power supply and demand difference fall within a predetermined range set in advance.

(Supplementary Note 1-13)

An electric power control method comprising:

acquiring a supplied energy which is an amount of electric power supplied from an electric power supplying means for supplying electric power, and also acquiring a consumed energy which is an amount of electric power consumed by a load means for accepting supply of electric power and consuming the electric power; and changing a status of supply of electric power to a distribution line with the load means connected depending on a total supplied energy and a total consumed energy, the total supplied energy being a total of the acquired supplied energy, and the total consumed energy being a total of the acquired consumed energy.

(Supplementary Note 1-14)

The electric power control method according to Supplementary Note 1-13, comprising:

calculating an electric power supply and demand difference representing a difference between the total supplied energy and the total consumed energy, changing a status of supply of electric power to the distribution line with the load means connected, and executing control so that the electric power supply and demand difference falls within a predetermined range set in advance.

(Supplementary Note 1-15)

The electric power control method according to Supplementary Note 1-14, comprising:

when a value as a result of subtracting the total supplied energy from the total consumed energy is larger than a preset value, changing a status of supply of electric power to the distribution line so as to stop supply of electric power to some of load means supplied with electric power, and making the electric power supply and demand difference fall within a predetermined range set in advance.

(Supplementary Note 2-1)

An electric power control system connected to an electric power supplying means for supplying electric power and a load means for accepting supply of electric power and consuming the electric power, the electric power control system comprising:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for, depending on a total supplied energy and a total consumed energy, transmitting and receiving electric power to and from another device to change the total supplied energy, the total supplied energy being a total of the acquired supplied energy, and the total consumed energy being a total of the acquired consumed energy.

(Supplementary Note 2-2)

The electric power control system according to Supplementary Note 2-1, wherein the electric power supply and demand controlling means calculates an electric power supply and demand difference representing a difference between the total supplied energy and the total consumed energy, and transmits and receives electric power to and from another device to change the total supplied energy, thereby executing control so that the electric power supply and demand difference falls within a predetermined range set in advance.

(Supplementary Note 2-3)

The electric power control system according to Supplementary Note 2-2, comprising a plurality of electric power supply and demand controlling means, the electric power supply and demand controlling means each belonging to any of groups determined in advance, and the electric power supply and demand controlling means each targeting the electric power supplying means and/or the load means set to belong to its group for control of electric power supply and demand, wherein the electric power supply and demand controlling means each transmit and receive electric power to and from another device placed outside its group to change the total supplied energy in its group, thereby making the electric power supply and demand difference in its group fall within a predetermined range set in advance.

(Supplementary Note 2-4)

The electric power control system according to Supplementary Note 2-3, wherein the electric power supply and demand controlling means each transmit and receive electric power to and from another of the electric power supply and demand controlling means and thereby make the electric power supply and demand difference in its group fall within a predetermined range set in advance, the other electric power supply and demand controlling means belonging to another of the groups.

(Supplementary Note 2-5)

The electric power control system according to Supplementary Note 2-4, wherein:

the electric power supplying means includes an electric power system which supplies a predetermined energy of electric power and a generator which generates and supplies electric power; and the electric power supply and demand controlling means belonging to each of a plurality of distribution substations to which different electric power supplying means and/or different load means belong, respectively, transmits and receives electric power to and from another of the electric power supply and demand controlling means and thereby executes control so that a sum of electric power supplies in the plurality of distribution substations becomes minimum, the other electric power supply and demand controlling means belonging to another of the distribution substations.

(Supplementary Note 2-6)

The electric power control system according to any one of Supplementary Notes 2-1 to 2-5, wherein:

the electric power supplying means includes an electric power system which supplies a predetermined electric power amount of electric power and a generator which generates and supplies electric power; and the electric power supply and demand controlling means has a function of, when electric power supplied from the electric power system to the distribution substation to which the electric power supplying means and/or the load means belongs stops, causing the generator to supply electric power to the load means.

(Supplementary Note 2-7)

The electric power control system according to any one of Supplementary Notes 2-2 to 2-5, wherein:

the electric power supplying means includes a generator which generates and supplies electric power; and when a value as a result of subtracting the total consumed energy from the total supplied energy is larger than a preset value, the electric power supply and demand controlling means controls a status of electric power generation so that energy generated by the generator decreases, thereby making the electric power supply and demand difference fall within a predetermined range set in advance.

(Supplementary Note 2-8)

A computer program comprising instructions for causing an information processing device, which is connected to an electric power supplying means for supplying electric power and a load means for accepting supply of electric power and consuming the electric power, to realize:

a supplied energy acquiring means for acquiring a supplied energy, the supplied energy being an amount of electric power supplied from the electric power supplying means;

a consumed energy acquiring means for acquiring a consumed energy, the consumed energy being an amount of electric power consumed by the load means; and an electric power supply and demand controlling means for, depending on a total supplied energy and a total consumed energy, transmitting and receiving electric power to and from another device to change the total supplied energy, the total supplied energy being a total of the acquired supplied energy, and the total consumed energy being a total of the acquired consumed energy.

(Supplementary Note 2-9)

The computer program according to Supplementary Note 2-8, wherein the electric power supply and demand controlling means calculates an electric power supply and demand difference representing a difference between the total supplied energy and the total consumed energy, and transmits and receives electric power to and from another device to change the total supplied energy, thereby executing control so that the electric power supply and demand difference falls within a predetermined range set in advance.

(Supplementary Note 2-10)

The computer program according to Supplementary Note 2-9, wherein:

a plurality of electric power supply and demand controlling means are included, the electric power supply and demand controlling means each belong to any of groups determined in advance, and the electric power supply and demand controlling means each target the electric power supplying means and/or the load means set to belong to its group for control of electric power supply and demand; and the electric power supply and demand controlling means each transmit and receive electric power to and from another device placed outside its group to change the total supplied energy in its group, thereby making the electric power supply and demand difference in its group fall within a predetermined range set in advance.

(Supplementary Note 2-11)

An electric power control method comprising:

acquiring a supplied energy which is an amount of electric power supplied from an electric power supplying means for supplying electric power, and also acquiring a consumed energy which is an amount of electric power consumed by a load means for accepting supply of electric power and consuming the electric power; and depending on a total supplied energy and a total consumed energy, transmitting and receiving electric power to and from another device to change the total supplied energy, the total supplied energy being a total of the acquired supplied energy, and the total consumed energy being a total of the acquired consumed energy.

(Supplementary Note 2-12)

The electric power control method according to Supplementary Note 2-11, comprising:

calculating an electric power supply and demand difference representing a difference between the total supplied energy and the total consumed energy, and transmitting and receiving electric power to and from another device to change the total supplied energy, thereby executing control so that the electric power supply and demand difference falls within a predetermined range set in advance.

(Supplementary Note 2-13)

The electric power control method according to Supplementary Note 2-12, wherein:

a plurality of electric power supply and demand controlling means are included, the electric power supply and demand controlling means each belong to any of groups determined in advance, and the electric power supply and demand controlling means each target the electric power supplying means and/or the load means set to belong to its group for control of electric power supply and demand, the electric power supply and demand controlling means being a means for transmitting and receiving electric power to and from an external device and changing the total supplied energy to execute control so that the electric power supply and demand difference falls within a predetermined range set in advance; and the electric power supply and demand controlling means each transmit and receive electric power to and from another device placed outside its group to change the total supplied energy in its group, thereby making the electric power supply and demand difference in its group fall within a predetermined range set in advance.

(Supplementary Note 3-1)

An electric power control system connected to at least one generator and at least one load supplied with electric power via a distribution line, the electric power control system comprising:

a generated energy acquiring means for acquiring a generated energy, the generated energy being an amount of electric power generated by the generator;

a consumed energy acquiring means for acquiring a consumed energy, the consumed energy being an amount of electric power consumed by the load; and an electric power supply and demand controlling means for calculating an electric power supply and demand difference and controlling a supply and demand status of electric power generated by the generator and electric power consumed by the load so that the electric power supply and demand difference falls within a predetermined range set in advance, the electric power supply and demand difference representing a difference between a total generated energy and a total consumed energy, the total generated energy being a total of the acquired generated energy, and the total consumed energy being a total of the acquired consumed energy.

According to the present invention, the system controls so that the difference between a total generated energy and a total consumed energy falls within an electric power variation allowance. The total electric power generation amount is the amount of electric power generated by all the generators directly connected to a distribution substation, and the total consumption is the sum of the loads placed on all the distribution lines directly connected to the distribution substation Therefore, stable electric power supply in a distribution substation can be achieved.

(Supplementary Note 3-2)

The electric power control system according to Supplementary Note 3-1, wherein when a value as a result of subtracting the total consumed energy from the total generated energy is larger than a preset value, the electric power supply and demand controlling means controls a status of electric power generation so that energy generated by the generator decreases, and makes the electric power supply and demand difference fall within a predetermined range set in advance.

According to the present invention, when a total consumed energy of a plurality of distribution lines is less than a total generated energy of the generator by a predetermined amount, the system controls to decrease energy generated by the generator. Consequently, the difference between the total consumed energy of the plurality of distribution lines and the total generated energy of the generator falls within a predetermined range, so that stable electric power supply in a distribution substation can be achieved.

(Supplementary Note 3-3)

The electric power control system according to Supplementary Note 3-1, wherein when a value as a result of subtracting the total consumed energy from the total generated energy is larger than a preset value, the electric power supply and demand controlling means controls a status of electric power supply so as to supply electric power to a new distribution line with a new load connected, and makes the electric power supply and demand difference fall within a predetermined range set in advance.

According to the present invention, when a total consumed energy of the distribution line is less than a total generated energy of the generator, another distribution line outputted from a distribution substation is added as a controlled object. Consequently, the difference between the total consumed energy of a plurality of distribution lines and the total generated energy of the generator can be made to fall within a predetermined range, and electric power can be supplied to more loads in a stable manner.

(Supplementary Note 3-4)

The electric power control system according to Supplementary Note 3-1, wherein when a value as a result of subtracting the total generated energy from the total consumed energy is larger than a preset value, the electric power supply and demand controlling means controls a status of electric power supply so as to stop supply electric power to some of distribution lines to which the load supplied with electric power is connected, and makes the electric power supply and demand difference fall within a predetermined range set in advance.

According to the present invention, when a total consumed energy of distribution lines is more than a total generated energy of the generator by a predetermined amount, supply of electric power to the distribution line which is a controlled object is stopped. Consequently, the difference between the total consumed energy of the plurality of distribution lines and the total generated energy of the generator can be made to fall within a predetermined range, and stable electric power supply can be achieved.

(Supplementary Note 3-5)

The electric power control system according to any one of Supplementary Notes 3-1 to 3-4, wherein when the electric power supply and demand difference cannot be made to fall within a predetermined range set in advance by control of an electric power supply and demand status on the generator and/or the load which are controlled objects, the electric power supply and demand controlling means transmits and receives electric power to and from a predetermined external device which is different from the generator and/or the load as the controlled objects, and makes the electric power supply and demand difference fall within a predetermined range set in advance.

According to the present invention, even when the difference between a total consumed energy of a plurality of distribution lines and a total generated energy of the generator cannot be made to fall within a predetermined range only by control of a controlled object, the system can perform necessary regulation of an electric power amount in cooperation with the outside.

(Supplementary Note 3-6)

The electric power control system according to any one of Supplementary Notes 3-1 to 3-5, comprising a plurality of electric power supply and demand controlling means, the electric power supply and demand controlling means each belonging to any of groups determined in advance, and the electric power supply and demand controlling means each targeting the generator and/or the load set to belong to its group for control.

According to the present invention, it is possible to manage controlled objects including a plurality of distribution lines outputted from a distribution substation and the generator by separating into a plurality of groups. Therefore, it is possible to easily manage small-scale electric power systems structured by the respective groups, and it is also possible to connect these systems to build a large-scale network.

(Supplementary Note 3-7)

The electric power control system according to Supplementary Note 3-6, wherein the electric power supply and demand controlling means transmits and receives electric power to and from another of the electric power supply and demand controlling means belonging to another of the groups, and makes the electric power supply and demand difference in its group fall within a predetermined range set in advance.

According to the present invention, it is possible to exchange electric power between the groups so that the difference between a total consumed energy of a plurality of distribution lines and a total generated energy of the generator falls within a predetermined range in the respective controlled objects managed in the separate groups.

(Supplementary Note 3-8)

The electric power control system according to Supplementary Note 3-6 or 3-7, wherein the electric power supply and demand controlling means supplies electric power to the distribution line with the load connected belonging to another of the groups, and/or stops supply of electric power to the distribution line with the load connected belonging to its group, thereby making the electric power supply and demand difference in its group fall within a predetermined range set in advance.

According to the present invention, it is possible to shift a distribution line to be managed between the groups so that the difference between a total consumed energy of a plurality of distribution lines and a total generated energy of the generator falls within a predetermined range in the respective controlled objects managed in the separate groups.

(Supplementary Note 3-9)

The electric power control system according to any of Supplementary Notes 3-1 to 3-8, wherein the generator has a function of supplying electric power to the load when electric power supplied to a distribution substation to which the generator and/or the load belongs stops.

According to the present invention, when electric power supplied to a distribution substation stops, supply of electric power to a distribution line included in a controlled object can be performed by the single controlled object or by the respective controlled objects managed in the separate groups in cooperation with each other.

(Supplementary Note 3-10)

The electric power control system according to any one of Supplementary Notes 3-1 to 3-9, wherein each of the electric power supply and demand controlling means respectively belonging to a plurality of distribution substations to which different generators and/or different loads belong, respectively, transmits and receives electric power to and from another of the electric power supply and demand controlling means belonging to another of the distribution substations, and controls so that a sum of supplied energy in the respective distribution substations becomes minimum.

According to the present invention, a controlled object or controlled objects managed in the separate groups cooperate with a plurality of distribution stations, whereby it is possible to control so that the sum of the supplied energy to the distribution substations becomes the minimum.

(Supplementary Note 3-11)

A computer program comprising instructions for causing an information processing device, which is connected to at least one generator and at least one load supplied with electric power via a distribution line, to realize:

a generated energy acquiring means for acquiring a generated energy, the generated energy being an amount of electric power generated by the generator;

a consumed energy acquiring means for acquiring a consumed energy, the consumed energy being an amount of electric power consumed by the load; and an electric power supply and demand controlling means for calculating an electric power supply and demand difference and controlling a supply and demand status of electric power generated by the generator and electric power consumed by the load so that the electric power supply and demand difference falls within a predetermined range set in advance, the electric power supply and demand difference representing a difference between a total generated energy and a total consumed energy, the total generated energy being a total of the acquired generated energy, and the total consumed energy being a total of the acquired consumed energy.

(Supplementary Note 3-12)

The computer program according to Supplementary Note 3-11, wherein when a value as a result of subtracting the total consumed energy from the total generated energy is larger than a preset value, the electric power supply and demand controlling means controls a status of electric power generation so that energy generated by the generator decreases, and makes the electric power supply and demand difference fall within a predetermined range set in advance.

(Supplementary Note 3-13)

An electric power system control method comprising:

acquiring a generated energy which is an amount of electric power generated by at least one generator, and also acquiring a consumed energy which is an amount of electric power consumed by at least one load supplied with electric power via a distribution line; and calculating a supplied energy and demand difference and controlling a supply and demand status of electric power generated by the generator and electric power consumed by the load so that the electric power supply and demand difference falls within a predetermined range set in advance, the electric power supply and demand difference representing a difference between a total generated energy and a total consumed energy, the total generated energy being a total of the acquired generated energy, and the total consumed energy being a total of the acquired consumed energy.

(Supplementary Note 3-14)

The electric power system control method according to Supplementary Note 3-13, comprising:

controlling a status of electric power generation so that energy generated by the generator decreases and making the electric power supply and demand difference fall within a predetermined range set in advance, when a value as a result of subtracting the total consumed energy from the total generated energy is larger than a preset value.

The computer program described above is recorded in a storage device or recorded on a computer-readable recording medium. For example, the recording medium is a portable medium such as a flexible disk, an optical disk, a magneto-optical disk and a semiconductor memory.

Although the present invention is described above referring to the exemplary embodiments, the present invention is not limited to the exemplary embodiments. The configurations and details of the present invention may be changed and modified in various manners that can be understood by one skilled in the art within the scope of the present invention.

INDUSTRIAL APPLICABILITY

Because the present invention enables configuration of a decentralized autonomous electric power supply system, introduction of a small-scale and unstable generator such as renewable energy is facilitated. Moreover, for example, in developing countries where a power supply capability is considerably lower than a demand due to delay of building of electric power infrastructure, applying the technique of the present invention makes it possible to connect small-scale electric power systems to build a large-scale network and makes it possible to increase return on investment of building of an electric power supply network.

The present invention is based upon and claims the benefit of priority from Japanese patent applications No. 2013-022001, filed on Feb. 7, 2013, and No. 2013-081131, filed on Apr. 9, 2013, the disclosures of which are incorporated herein in their entireties by reference.

DESCRIPTION OF REFERENCE NUMERALS 1, 1A, 1B distribution substation
2 generator
3, 30, 31, 32 distribution line
4 load
5, 15, 25 electric power system
6 electric power measuring instrument
10 control device
11 supplied energy acquisition part
12 consumed energy acquisition part
13, 22a, 23a electric power control part
14 storage part
16 communication part
17 bus coupler
21, 22, 23 control part
50 to 53, 60 switch

The invention claimed is:

1. An electric power control system connected to an electric power supplying unit for supplying electric power and a load unit for accepting supply of electric power and consuming the electric power, the electric power control system comprising:

a supplied energy acquiring unit for acquiring a supplied energy, the supplied energy being an amount of electric power supplied from the electric power supplying unit;

a consumed energy acquiring unit for acquiring a consumed energy, the consumed energy being an amount of electric power consumed by the load unit; and an electric power supply and demand controlling unit for, depending on a total supplied energy and a total consumed energy, transmitting and receiving electric power to and from another device to change the total supplied energy, the total supplied energy being a total of the acquired supplied energy, and the total consumed energy being a total of the acquired consumed energy, wherein the electric power supply and demand controlling unit calculates an electric power supply and demand difference representing a difference between the total supplied energy and the total consumed energy, and transmits and receives electric power to and from another device to change the total supplied energy, thereby executing control so that the electric power supply and demand difference falls within a predetermined range set in advance, the system further comprising a plurality of electric power supply and demand controlling units, the electric power supply and demand controlling units each belonging to any of groups determined in advance, and the electric power supply and demand controlling units each targeting the electric power supplying unit and/or the load unit set to belong to its group for control of electric power supply and demand, wherein the electric power supply and demand controlling units each transmit and receive electric power to and from another device placed outside its group to change the total supplied energy in its group, thereby making the electric power supply and demand difference in its group fall within a predetermined range set in advance, wherein the electric power supply and demand controlling units each transmit and receive electric power to and from another of the electric power supply and demand controlling units and make the electric power supply and demand difference in its group fall within a predetermined range set in advance, the other electric power supply and demand controlling unit belonging to another of the groups, and wherein the electric power supplying unit includes an electric power system which supplies a predetermined energy of electric power and a generator which generates and supplies electric power; and the electric power supply and demand controlling unit belonging to each of a plurality of distribution substations to which different electric power supplying units and/or different load units belong, respectively, transmits and receives electric power to and from another of the electric power supply and demand controlling units and thereby executes control so that a sum of supplied energy in the plurality of distribution substations becomes minimum, the other electric power supply and demand controlling unit belonging to another of the distribution substations.

2. An electric power control system connected to an electric power supplying unit for supplying electric power and a load unit for accepting supply of electric power and consuming the electric power, the electric power control system comprising:

a supplied energy acquiring unit for acquiring a supplied energy, the supplied energy being an amount of electric power supplied from the electric power supplying unit;

a consumed energy acquiring unit for acquiring a consumed energy, the consumed energy being an amount of electric power consumed by the load unit; and an electric power supply and demand controlling unit for, depending on a total supplied energy and a total consumed energy, transmitting and receiving electric power to and from another device to change the total supplied energy, the total supplied energy being a total of the acquired supplied energy, and the total consumed energy being a total of the acquired consumed energy, wherein the electric power supply and demand controlling unit calculates an electric power supply and demand difference representing a difference between the total supplied energy and the total consumed energy, and transmits and receives electric power to and from another device to change the total supplied energy, thereby executing control so that the electric power supply and demand difference falls within a predetermined range set in advance, wherein the electric power supplying unit includes an electric power system which supplies a predetermined energy of electric power and a generator which generates and supplies electric power; and the electric power supply and demand controlling unit has a function of, when electric power supplied from the electric power system to the distribution substation to which the electric power supplying unit and/or the load unit belongs stops, causing the generator to supply electric power to the load unit.

3. An electric power control system connected to an electric power supplying unit for supplying electric power and a load unit for accepting supply of electric power and consuming the electric power, the electric power control system comprising:

a supplied energy acquiring unit for acquiring a supplied energy, the supplied energy being an amount of electric power supplied from the electric power supplying unit;

a consumed energy acquiring unit for acquiring a consumed energy, the consumed energy being an amount of electric power consumed by the load unit; and an electric power supply and demand controlling unit for, depending on a total supplied energy and a total consumed energy, transmitting and receiving electric power to and from another device to change the total supplied energy, the total supplied energy being a total of the acquired supplied energy, and the total consumed energy being a total of the acquired consumed energy, wherein the electric power supply and demand controlling unit calculates an electric power supply and demand difference representing a difference between the total supplied energy and the total consumed energy, and transmits and receives electric power to and from another device to change the total supplied energy, thereby executing control so that the electric power supply and demand difference falls within a predetermined range set in advance, wherein the electric power supplying unit includes a generator which generates and supplies electric power; and when a value as a result of subtracting the total consumed energy from the total supplied energy is larger than a preset value, the electric power supply and demand controlling unit controls a status of electric power generation so that energy generated by the generator decreases, thereby making the electric power supply and demand difference fall within a predetermined range set in advance.

* * * * *